(12) United States Patent
Yu et al.

(10) Patent No.: US 11,527,952 B2
(45) Date of Patent: Dec. 13, 2022

(54) CHARGE PUMP STABILITY CONTROL

(71) Applicant: pSemi Corporation, San Diego, CA (US)

(72) Inventors: Tim Wen Hui Yu, Fremont, CA (US); Gregory Szczeszynski, Hollis, NH (US)

(73) Assignee: PSEMI CORPORATION, San Diego, CA (US)

( * ) Notice: Subject to any disclaimer, the term of this patent is extended or adjusted under 35 U.S.C. 154(b) by 0 days.

(21) Appl. No.: 17/450,562

(22) Filed: Oct. 12, 2021

(65) Prior Publication Data

US 2022/0103067 A1 Mar. 31, 2022

Related U.S. Application Data

(63) Continuation of application No. 16/849,869, filed on Apr. 15, 2020, now Pat. No. 11,177,735, which is a continuation of application No. 16/299,719, filed on Mar. 12, 2019, now Pat. No. 10,693,368, which is a continuation-in-part of application No. 16/037,362, filed on Jul. 17, 2018, now Pat. No. 10,454,368, which is a continuation of application No. 15/850,117, filed on Dec. 21, 2017, now Pat. No. 10,027,224, which is a continuation of application No. 15/126,073, filed as application No.
(Continued)

(51) Int. Cl.
*H02M 3/07* (2006.01)
*G05F 3/20* (2006.01)

(52) U.S. Cl.
CPC ............... *H02M 3/07* (2013.01); *G05F 3/205* (2013.01); *H02M 3/073* (2013.01); *H02M 3/075* (2021.05); *H02M 3/077* (2021.05)

(58) Field of Classification Search
CPC .......... G05F 3/205; H02M 3/07; H02M 3/073
See application file for complete search history.

(56) References Cited

U.S. PATENT DOCUMENTS

| 4,214,174 A | 7/1980 | Dickson |
| 4,812,961 A | 3/1989 | Essaff |
| 5,132,606 A | 7/1992 | Herbert |

(Continued)

FOREIGN PATENT DOCUMENTS

| CN | 1057410 | 10/2000 |
| CN | 1728518 | 2/2006 |

(Continued)

OTHER PUBLICATIONS

Umeno—"A New Approach to Low Ripple-Noise Switching Converters on the Basis of Switched-Capacitor Converters", IEEE International Symposium on Circuits and Systems, vol. 2, pp. 1077-1080, Jun. 1991, 4 pages.
(Continued)

*Primary Examiner* — Gary A Nash
(74) *Attorney, Agent, or Firm* — Finnegan, Henderson, Farabow, Garrett & Dunner, LLP

(57) ABSTRACT

During its first and second residence times, corresponding first and second currents flow between a charge pump and a circuit that connects to one of the charge pump's terminals. Based on a feedback measurement from the charge pump, a controller adjusts these first and second currents.

21 Claims, 17 Drawing Sheets

Related U.S. Application Data

PCT/US2015/019860 on Mar. 11, 2015, now Pat. No. 9,887,622.

(60) Provisional application No. 61/953,303, filed on Mar. 14, 2014, provisional application No. 61/953,270, filed on Mar. 14, 2014.

(56) References Cited

U.S. PATENT DOCUMENTS

| | | |
|---|---|---|
| 5,132,895 A | 7/1992 | Kase |
| 5,301,097 A | 4/1994 | McDaniel |
| 5,737,201 A | 4/1998 | Meynard |
| 5,761,058 A | 6/1998 | Kanda |
| 5,801,987 A | 9/1998 | Dinh |
| 5,907,484 A * | 5/1999 | Kowshik ............... H02M 3/073 363/60 |
| 5,978,283 A | 11/1999 | Hsu |
| 6,021,056 A | 2/2000 | Forbes |
| 6,107,864 A * | 8/2000 | Fukushima ........... H02M 3/073 363/60 |
| 6,476,666 B1 | 11/2002 | Palusa |
| 6,486,728 B2 | 11/2002 | Kleveland |
| 6,501,325 B1 | 12/2002 | Meng |
| 6,504,422 B1 | 1/2003 | Rader |
| 6,759,766 B2 | 7/2004 | Hiratsuka |
| 6,822,884 B1 * | 11/2004 | Rosenthal ............... H02M 3/07 363/59 |
| 6,927,441 B2 | 8/2005 | Pappalardo |
| 6,980,181 B2 | 12/2005 | Sudo |
| 7,135,847 B2 | 11/2006 | Taurand |
| 7,145,382 B2 | 12/2006 | Ker |
| 7,190,210 B2 | 3/2007 | Azrai |
| 7,224,062 B2 | 5/2007 | Hsu |
| 7,239,194 B2 | 7/2007 | Azrai |
| 7,250,810 B1 | 7/2007 | Tsen |
| 7,408,330 B1 | 8/2008 | Zhao |
| 7,511,978 B2 | 3/2009 | Chen |
| 7,595,682 B2 | 9/2009 | Lin |
| 7,724,551 B2 | 5/2010 | Yanagida |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,928,705 B2 | 4/2011 | Hooijschuur |
| 7,999,601 B2 | 8/2011 | Schlueter |
| 8,018,216 B2 | 9/2011 | Kakehi |
| 8,040,174 B2 | 10/2011 | Likhterov |
| 8,048,766 B2 | 11/2011 | Joly |
| 8,111,054 B2 | 2/2012 | Yen |
| 8,159,091 B2 | 4/2012 | Yeates |
| 8,183,931 B2 * | 5/2012 | Lesso .................. H03G 1/0088 330/297 |
| 8,193,604 B2 | 6/2012 | Lin |
| 8,212,541 B2 | 7/2012 | Perreault |
| 8,339,184 B2 | 12/2012 | Kok |
| 8,350,549 B2 | 1/2013 | Kitabatake |
| 8,354,828 B2 | 1/2013 | Huang |
| 8,384,467 B1 | 2/2013 | O'Keeffe |
| 8,395,914 B2 | 3/2013 | Klootwijk |
| 8,456,874 B2 | 6/2013 | Singer |
| 8,503,203 B1 | 8/2013 | Szczeszynski |
| 8,643,347 B2 | 2/2014 | Giuliano |
| 8,723,491 B2 | 5/2014 | Giuliano |
| 8,803,492 B2 | 8/2014 | Liu |
| 9,887,622 B2 | 2/2018 | Low |
| 10,027,224 B2 | 7/2018 | Low |
| 10,454,368 B2 | 10/2019 | Low |
| 10,693,368 B2 | 6/2020 | Yu |
| 11,031,864 B2 | 6/2021 | Low |
| 2002/0008567 A1 | 1/2002 | Henry |
| 2003/0169096 A1 | 9/2003 | Hsu |
| 2003/0227280 A1 | 12/2003 | Vinciarelli |
| 2004/0041620 A1 | 3/2004 | D'Angelo |
| 2005/0007184 A1 | 1/2005 | Kamijo |
| 2005/0207133 A1 | 9/2005 | Pavier |
| 2007/0210774 A1 | 9/2007 | Kimura |
| 2007/0230221 A1 | 10/2007 | Lim |
| 2008/0013349 A1 | 1/2008 | Yanagida |
| 2008/0084239 A1 * | 4/2008 | Oswald .................. H02M 3/07 327/536 |
| 2008/0150621 A1 | 6/2008 | Lesso |
| 2008/0157732 A1 | 7/2008 | Williams |
| 2008/0157733 A1 | 7/2008 | Williams |
| 2008/0158915 A1 | 7/2008 | Williams |
| 2008/0239772 A1 | 10/2008 | Oraw |
| 2008/0284398 A1 | 11/2008 | Qiu |
| 2009/0059630 A1 | 3/2009 | Williams |
| 2009/0102439 A1 | 4/2009 | Williams |
| 2009/0174383 A1 | 7/2009 | Tsui |
| 2009/0257211 A1 | 10/2009 | Kontani |
| 2009/0278520 A1 | 11/2009 | Perreault |
| 2010/0039165 A1 | 2/2010 | Chaoui |
| 2010/0110741 A1 | 5/2010 | Lin |
| 2010/0140736 A1 | 6/2010 | Lin |
| 2010/0202161 A1 | 8/2010 | Sims |
| 2010/0214746 A1 | 8/2010 | Lotfi |
| 2010/0244189 A1 | 9/2010 | Klootwijk |
| 2010/0244585 A1 | 9/2010 | Tan |
| 2010/0277152 A1 | 11/2010 | Macfarlane |
| 2011/0026275 A1 | 2/2011 | Huang |
| 2011/0148510 A1 | 6/2011 | Dhuyvetter |
| 2011/0163414 A1 | 7/2011 | Lin |
| 2011/0204858 A1 | 8/2011 | Kudo |
| 2011/0018618 A1 | 11/2011 | Shiu |
| 2012/0075009 A1 * | 3/2012 | Barrenscheen ...... H04B 5/0037 327/536 |
| 2012/0119718 A1 | 5/2012 | Song |
| 2012/0139515 A1 | 6/2012 | Li |
| 2012/0146177 A1 | 6/2012 | Choi |
| 2012/0146451 A1 | 6/2012 | Nitta |
| 2012/0153907 A1 | 6/2012 | Carobolante |
| 2012/0154023 A1 | 6/2012 | Pan |
| 2012/0313602 A1 | 12/2012 | Perreault |
| 2012/0326684 A1 | 12/2012 | Perreault |
| 2013/0049714 A1 | 2/2013 | Chiu |
| 2013/0069614 A1 | 3/2013 | Tso |
| 2013/0094157 A1 | 4/2013 | Giuliano |
| 2013/0154600 A1 | 6/2013 | Giuliano |
| 2013/0229841 A1 | 9/2013 | Giuliano |
| 2014/0159681 A1 | 6/2014 | Oraw |
| 2015/0077175 A1 * | 3/2015 | Giuliano ................ H02M 3/07 327/536 |
| 2017/0170723 A1 | 6/2017 | Low |
| 2018/0166987 A1 | 6/2018 | Low |
| 2018/0323706 A1 | 11/2018 | Low |
| 2019/0207514 A1 | 7/2019 | Yu |
| 2020/0195135 A1 | 6/2020 | Low |

FOREIGN PATENT DOCUMENTS

| | | |
|---|---|---|
| CN | 1825485 | 8/2006 |
| CN | 101174789 | 5/2008 |
| CN | 101447753 | 6/2009 |
| CN | 101765963 | 6/2010 |
| CN | 106165279 | 11/2016 |
| CN | 110224588 | 9/2019 |
| CN | 111697821 | 9/2020 |
| DE | 112015001260 | 12/2016 |
| EP | 0773622 | 5/1997 |
| GB | 2538665 | 11/2016 |
| JP | H10327573 | 12/1998 |
| JP | H11235053 | 8/1999 |
| JP | 2006067783 | 3/2006 |
| JP | 2010045943 | 2/2010 |
| KR | 20110061121 | 6/2011 |
| KR | 20160133530 | 11/2016 |
| TW | 201547171 | 12/2015 |
| WO | WO2006093600 | 9/2006 |
| WO | WO2009112900 | 9/2009 |
| WO | WO2012151466 | 11/2012 |

(56) References Cited

FOREIGN PATENT DOCUMENTS

| WO | WO2013059446 | 4/2013 |
|---|---|---|
| WO | WO2013096416 | 6/2013 |
| WO | WO2015138547 | 9/2015 |

OTHER PUBLICATIONS

Meynard—"Multi-Level Conversion: High Voltage Choppers and Voltage-Source Inverters", PESC '92 Record, 23rd Annual IEEE Power Electronics Specialists Conference, pp. 397-403, 1992, 7 pages.

Markowski—"Performance Limits of Switched-Capacitor DC-DC Converters", Proceedings of PESC '95—Power Electronics Specialist Conference, pp. 1215-1221, Jun. 18, 1995, 7 pages.

Middlebrook—"Transformerless DC-to-DC Converters with Large Conversion Ratios", IEEE Transactions on Power Electronics, vol. 3, No. 4, pp. 484-488, Oct. 1988, 7 pages.

"2A, 3MHz Micropower Synchronous Boost Converter", Linear Technology Data Sheet for Part LTC3402, 2000.

Starzyk—"A DC-DC Charge Pump Design based on Voltage Doublers", IEEE Transactions on Circuits and Systems—I: Fundamental Theory and Applications, vol. 48, No. 3, pp. 350-359, Mar. 2001, 11 pages.

Ottman—"Optimized Piezoelectric Energy Harvesting Circuit using Step-Down Converter in Discontinuous Conduction Mode", 33rd Annual IEEE Power Electronics Specialists Conference, Proceedings (Cat. No. 02CH37289), pp. 1988-1994, 2002, 7 pages.

3-V to 6-V Input, 3-A Output Synchronous-Buck PWM Switcher with Integrated FETs, Texas Instruments Data Sheet for Part TPS54310, 2002-2005.

Abutbul—"Step-Up Switching-Mode Converter with High Voltage Gain Using a Switched-Capacitor Circuit" IEEE Transactions on Circuits and Systems I, vol. 50, pp. 1098-1102, Aug. 2003, 100 pages.

Axelrod—"Single-Switch Single-Stage Switched-Capacitor Buck Converter", Proc. of NORPIE 2004, 4th Nordic Workshop on Power and Industrial Electronics, Jun. 2004.

Ma—"Design and Optimization of Dynamic Power System for Self-Powered Integrated Wireless Sensing Nodes", ACM ISLPED '05 Conference, pp. 303-306, Aug. 8, 2005, 4 pages.

Wood—"Design, Fabrication and Initial Results of a 2g Autonomous Glider", 31st Annual Conference of IEEE Industrial Electronics Society, pp. 1870-1877, Nov. 2005, 8 pages.

Xu—"Voltage Divider and its Application in Two-Stage Power Architecture", Twenty-First Annual IEEE Applied Power Electronics Conference and Exposition, pp. 499-504, Mar. 2006, 6 pages.

Sun—"High Power Density, High Efficiency System Two-Stage Power Architecture for Laptop Computers", 37th IEEE Power Electronics Specialists Conference, Jun. 2006, 7 pages.

Han—"A New Approach to Reducing Output Ripple in Switched-Capacitor-based Step-Down DC-DC Converters", IEEE Transactions on Power Electronics, vol. 21, No. 6, pp. 1548-1555, Nov. 2006, 8 pages.

Pilawa-Podgurski—"Merged Two-Stage Power Converter Architecture with Soft Charging Switched-Capacitor Energy Transfer", 39th IEEE Power Electronics Specialists Conference, pp. 4008-4015, 2008, 8 pages.

Ng, Vincent Wai-Shan—"Switched Capacitor DC-DC Converter: Superior Where the Buck Converter has Dominated", PhD Thesis, University of California, Berkeley, Aug. 17, 2011, 139 pages.

Pilawa-Podgurski—"Merged Two-Stage Power Converter with Soft Charging Switched-Capacitor Stage in 180 nm CMOS", IEEE Journal of Solid-State Circuits, vol. 47, No. 7, pp. 1557-1567, Jul. 2012, 10 pages.

Lei—"Analysis of Switched-Capacitor DC-DC Converters in Soft-Charging Operation", 14th IEEE Workshop on Control and Modeling for Power Electronics, Jun. 23, 2013, 7 pages.

Cervera—"A High Efficiency Resonant Switched Capacitor Converter with Continuous Conversion Ratio", Energy Conversion Congress and Exposition (ECCE), IEEE, pp. 4969-4976, Sep. 15-19, 2013, 8 pages.

U.S. Appl. No. 15/126,073 / 400.P015PCTUS: US Patent Application and Application Data Sheet filed and Preliminary Amendment received dated Sep. 14, 2016, 63 pages (30096-015US1).

U.S. Appl. No. 15/126,073 / 400.P015PCTUS: Power of Attorney, Request for Corrected Filing Receipt and Application Data Sheet filed dated Oct. 13, 2016, 7 pages (30096-015US1).

U.S. Appl. No. 15/126,073 / 400.P015PCTUS: Filing Receipt and Notice of DO/EO Acceptance dated Mar. 10, 2017, 5 pages (30096-015US1).

U.S. Appl. No. 15/126,073 / 400.P015PCTUS: Notice of Publication dated Jun. 15, 2017, 1 page (30096-015US1).

U.S. Appl. No. 15/126,073 / 400.P015PCTUS: Power of Attorney, Request to change applicant name and Application Data Sheet filed Oct. 5, 2017, 7 pages (30096-015US1).

U.S. Appl. No. 15/126,073 / 400.P015PCTUS: Corrected Filing Receipt dated Oct. 11, 2017, 3 pages (30096-015US1).

U.S. Appl. No. 15/126,073 / 400.P015PCTUS: Notice of Allowance dated Nov. 6, 2017, 10 pages (30096-015US1).

U.S. Appl. No. 15/126,073 / 400.P015PCTUS: Issue Fee Payment dated Dec. 18, 2017, 1 page (30096-015US1).

U.S. Appl. No. 15/126,073 / 400.P015PCTUS: Issue Notification dated Jan. 17, 2018, 1 page (30096-015US1).

U.S. Appl. No. 15/850,117 / 400.P015PCTUSC: Patent Application, Power of Attorney and Application Data Sheet filed Dec. 21, 2017, 47 pages (30096-015002).

U.S. Appl. No. 15/850,117 / 400.P015PCTUSC: Notice to File Missing Parts & Filing Receipt dated Jan. 18, 2018, 5 pages (30096-015002).

U.S. Appl. No. 15/850,117 / 400.P015PCTUSC: Applicant Response to Pre-Exam Formalities Notice and Preliminary Amendment dated Mar. 19, 2018, 2 pages (30096-015002).

U.S. Appl. No. 15/850,117 / 400.P015PCTUSC: Application Data Sheet and Request to change applicant name filed Feb. 28, 2018, 7 pages (30096-015002).

U.S. Appl. No. 15/850,117 / 400.P015PCTUSC: Updated Filing Receipt dated Mar. 6, 2018, 3 pages (30096-015002).

U.S. Appl. No. 15/850,117 / 400.P015PCTUSC: Application Data Sheet filed Apr. 24, 2018, 6 pages (30096-015002).

U.S. Appl. No. 15/850,117 / 400.P015PCTUSC: Notice of Allowance dated May 10, 2018, 10 pages (30096-015002).

U.S. Appl. No. 15/850,117 / 400.P015PCTUSC: Corrected Filing Receipt dated May 17, 2018, 3 pages (30096-015002).

U.S. Appl. No. 15/850,117 / 400.P015PCTUSC: Notice of Publication dated Jun. 14, 2018, 1 page (30096-015002).

U.S. Appl. No. 15/850,117 / 400.P015PCTUSC: Issue Fee Payment dated Jun. 18, 2018, 1 page (30096-015002).

U.S. Appl. No. 15/850,117 / 400.P015PCTUSC: Issue Notification dated Jun. 27, 2018, 1 page (30096-015002).

U.S. Appl. No. 16/037,362 / 400.P015PCTUSC2: Patent Application and Application Data Sheet filed Jul. 17, 2018, 48 pages (30096-015003).

U.S. Appl. No. 16/037,362 / 400.P015PCTUSC2: Filing Receipt dated Aug. 1, 2018, 4 pages (30096-015003).

U.S. Appl. No. 16/037,362 / 400.P015PCTUSC2: Notice of Publication dated Nov. 8. 2018, 1 page (30096-015003).

U.S. Appl. No. 16/037,362 / 400.P015PCTUSC2: Non-Final Office Action dated Jan. 2, 2019, 9 pages.

U.S. Appl. No. 16/037,362 / 400.P015PCTUSC2: Power of Attorney dated Jan. 4, 2019, 1 page (30096-015003).

U.S. Appl. No. 16/037,362 / 400.P015PCTUSC2: Terminal Disclaimer review decision and Termincal Disclaimer Filed Apr. 2, 2019, 3 pages (30096-015003).

U.S. Appl. No. 16/037,362 / 400.P015PCTUSC2: Notice of Allowance dated Apr. 19, 2019, 9 pages (30096-015003).

U.S. Appl. No. 16/037,362 / 400.P015PCTUSC2: Issue Fee Payment and 312 Amendment dated Jul. 19, 2019, 2 pages (30096-015003).

(56) References Cited

OTHER PUBLICATIONS

U.S. Appl. No. 16/037,362 / 400.P015PCTUSC2: 312 Amendment initianed by the examiner dated Aug. 22, 2019, 1 page (30096-015003).
U.S. Appl. No. 16/037,362 / 400.P015PCTUSC2: Issue Notification dated Oct. 2, 2019, 1 page (30096-015003).
U.S. Appl. No. 16/658,570 / 400.P015PCTUSC3: Patent Application, Application Data Sheet and Power of Attorney dated Oct. 21, 2019, 50 pages (30096-015004).
U.S. Appl. No. 16/658,570 / 400.P015PCTUSC3: Filing Receipt and Notice to File Missing Parts dated Nov. 7, 2019, 6 pagees (30096-015004).
U.S. Appl. No. 16/658,570 / 400.P015PCTUSC3: Filing Receipt dated Mar. 11, 2020, 4 pages (30096-015004).
U.S. Appl. No. 16/658,570 / 400.P015PCTUSC3: Non-Final Office Action dated Apr. 2, 2020, 6 pages.
U.S. Appl. No. 16/658,570 / 400.P015PCTUSC3: Power of Attorney dated Apr. 13, 2020, 3 pages (30096-015004).
U.S. Appl. No. 16/658,570 / 400.P015PCTUSC3: Notice of Publication dated Jun. 18, 2020, 1 page (30096-015004).
U.S. Appl. No. 16/658,570 / 400.P015PCTUSC3: Amendment after Non-Final Rejection dated Oct. 2, 2020, 1 page (30096-015004).
U.S. Appl. No. 16/658,570 / 400.P015PCTUSC3: Notice of Allowance dated Oct. 19, 2020, 10 pages.
U.S. Appl. No. 16/658,570 / 400.P015PCTUSC3: Request for Continued Examincation filed Jan. 19, 2021, 27 pages.
U.S. Appl. No. 16/658,570 / 400.P015PCTUSC3: Issue Fee Payment filed May 4, 2021, 6 pages.
U.S. Appl. No. 16/658,570 / 400.P015PCTUSC3: Issue Notification dated May 19, 2021, 6 pages.
U.S. Appl. No. 17/307,921 / 400.P015PCTUSC4: filed May 4, 2021, 54 pages.
U.S. Appl. No. 17/307,921 / 400.P015PCTUSC4: Filing Receipt dated May 12, 2021, 5 pages.
U.S. Appl. No. 17/307,921 / 400.P015PCTUSC4: Notice to File Missing Parts dated May 12, 2021, 2 pages.
U.S. Appl. No. 16/299,719 / 400.P043X: filed Mar. 12, 2019, 90 pages.
U.S. Appl. No. 16/299,719 / 400.P043X: Filing Recipt dated Mar. 28, 2019, 4 pages.
U.S. Appl. No. 16/299,719 / 400.P043X: Non-Final Office Action dated Jun. 27, 2019, 14 pages.
U.S. Appl. No. 16/299,719 / 400.P043X: Notice of Publication dated Jul. 5, 2019, 1 page.
U.S. Appl. No. 16/299,719 / 400.P043X: Response to Non-final Office Action filed Dec. 13, 2019, 20 pages.
U.S. Appl. No. 16/299,719 / 400.P043X: Notice of Allowance dated Jan. 15, 2020, 7 pages.
U.S. Appl. No. 16/299,719 / 400.P043X: Issue Fee Payment and 312 Response filed dated Apr. 15, 2020, 4 pages.
U.S. Appl. No. 16/299,719 / 400.P043X: Issue Notification dated Jun. 3, 2020, 1 page.
PCT/US2015/019860/ 400.P015PCT: Application Body as Filed dated Mar. 11, 2015, 49 pages (30096-015WO1).
PCT/US2015/019860/ 400.P015PCT: Invitation to Correct Defects in the International Application, Notification of the International Application Number and of the International Filing Date and Notification Concerning Payment of Prescribed Fees datd Mar. 18, 2015, 7 pages (30096-015WO1).
PCT/US2015/019860/ 400.P015PCT: Notification of Receipt of Search Copy dated Mar. 24, 2015, 1 page (30096-015WO1).
PCT/US2015/019860/ 400.P015PCT: Notification of Receipt of record copy dated Mar. 31, 2015, 1 page (30096-015WO1).
PCT/US2015/019860/ 400.P015PCT: Notification Concerning Submission or Transmittal of Priority Document dated Apr. 1, 2015, 1 page (30096-015WO1).
PCT/US2015/019860/ 400.P015PCT: International Searcg Report & Written Opinion dated Jun. 19, 2015, 9 pages (30096-015WO1).
PCT/US2015/019860/ 400.P015PCT: Notification Concerning the Filing of Amendments of the Claims dated Aug. 19, 2015, 1 page (30096-015WO1).
PCT/US2015/019860/ 400.P015PCT: Notification Concerning Availability of Publication of the International Application dated Sep. 17, 2015, 1 page (30096-015WO1).
PCT/US2015/019860/ 400.P015PCT: Notice Informing the Applicant of the Communication of the International Application to the Designated Offices dated Oct. 15, 2015, 1 page (30096-015WO1).
PCT/US2015/019860/ 400.P015PCT: International Preliminary Report dated Jun. 15, 2016, 17 pages (30096-015WO1).
PCT/US2015/019860/ 400.P015PCT: Notice Informing the Applicant of the Communication of the International Application to the Designated Offices dated Jul. 14, 2016, 1 page (30096-015WO1).
PCT/US2015/019860/ 400.P015PCT: Notification of the Recording of a Change dated Sep. 7, 2016, 1 page (30096-015WO1).
CN 201580014388.3 / 400.P015PCTCN: First Office Action dated May 3, 2018, 14 pages (30096-015CN1).
CN 201580014388.3 / 400.P015PCTCN: Notification to Grant dated Jan. 22, 2019, 3 pages (30096-015CN1).
CN 201580014388.3 / 400.P015PCTCN: First Search dated Apr. 23, 2018, 2 pages (30096-015CN1).
CN 201910277476 / 400.P015PCTCN2: Patent Application filed Apr. 8, 2019, 32 pages (30096-015CN1).
CN 201910277476.2 / 400.P015PCTCN2: First Office Action dated Nov. 2, 2020, 8 pages (30096-015CN1).
CN 201910277476.2 / 400.P015PCTCN2: Office Action dated Nov. 20, 2020, 13 pages (30096-015CN1).
CN 201910277476.2 / 400.P015PCTCN2: First Search dated Oct. 24, 2020, 2 pages (30096-015CN1).
CN 201910277476.2 / 400.P015PCTCN2: Response to Office Action filed Mar. 8, 2021, 40 pages (30096-015CN1).
DE 112015001260 / 400.P015PCTDE: Patent Application filed Sep. 14, 2016, 85 pages (30096-015DE1).
GB 1615324.9 / 400.P015PCTGB: Patent Application filed Sep. 8, 2016, 50 pages, (30096-015GB1).
GB 1615324.9 / 400.P015PCTGB: Examination Report Under Section 18(3) dated Sep. 8, 2020, 2 pages (30096-015GB1).
GB 1615324.9 / 400.P015PCTGB: Response to Examination Report Under Section 18(3) filed Mar. 5, 2020, 26 pages (30096-015GB1).
GB2108160.9 / 400.P015PCTGB2: GB Patent Application filed Jun. 8, 2021, 49 pages.
KR 10-2016-7028577 / 400.P015PCTKR: Patent Application filed Oct. 14, 2016, 99 pages (30096-015KR1).
KR 10-2016-7028577 / 400.P015PCTKR: Request for Examination dated Feb. 13, 2020, 3 pages (30096-015KR1).
CN202010162442 / 400.P043XCN: Cn Application filed Mar. 10, 2020, 89 pages.
CN202010162442 / 400.P043XCN: Notice of Passing Preliminary Examination dated Apr. 30, 2020, 3 pages.
CN202010162442 / 400.P043XCN: Notice of Publication dated Sep. 27, 2020, 4 pages.

\* cited by examiner

CHARGE PUMP STABILITY CONTROL

RELATED APPLICATIONS

Under 35 USC 120 this application is a continuation-in-part of U.S. application Ser. No. 16/037,362, filed on Jul. 17, 2017, which is a continuation of U.S. application Ser. No. 15/850,117, filed on Dec. 21, 2017, which is a continuation of U.S. application Ser. No. 15/126,073, filed on Sep. 14, 2016, which is the national phase under 35 USC 371 of International Application No. PCT/US2015/019860, filed on Mar. 11, 2015 which under 35 USC 119, claims the benefit of the Mar. 14, 2014 priority date of U.S. Provisional Application 61/953,303 and the Mar. 14, 2014 priority date of U.S. Provisional Application 61/953,270, the contents of which are herein incorporated by reference.

FIELD OF DISCLOSURE

This invention relates to power converters, and in particular, to charge pumps.

BACKGROUND

In many circuits, the power that is available to drive the circuit may not be in a form that the circuit demands. To correct this, it is useful to provide a power converter that converts the available power into a form that conforms to the circuit's requirements.

One common type of power converter is a switch-mode power converter. A switch-mode power converter produces a voltage by switching reactive circuit elements into different electrical configurations using a switch network. A switched-capacitor power converter is a type of switch-mode power converter that primarily utilizes capacitors to transfer energy. Such converters are called "charge pumps." The capacitors are called "pump capacitors."

In operation, a charge pump transitions from one pump-state to the next in a sequence of pump-states. Each pump-state is characterized by a residence time in which the charge pump remains in that pump-state, and transition times, in which the charge pump is between pump-states. The sum of the residence times for all pump-states and the intervening transition times between those pump-states is the period for one cycle of the charge pump.

For correct operation, each pump capacitor should begin and end each cycle with zero change in charge. If this is not the case, charge will accumulate on the pump capacitor over the course of several cycles in the case of positive non-zero change in charge. Since the voltage across a capacitor is linearly proportional to the charge, this charge accretion/depletion will cause the voltage across the pump capacitor to drift over time.

In many charge pumps, a switch connects adjacent pump capacitors. The voltage across the switch thus depends on the voltages across adjacent pump capacitors. If voltages across these capacitors drift unevenly, the voltage across the switch may exceed its rating. This may cause the switch to overheat, thus destroying the switch, and the charge pump as well.

Procedures for managing charge on a pump capacitor depend in part on how the charge got there. In general, there are two ways to put charge into a capacitor: using a voltage source or using a current source.

When a voltage source is used, management of charge is relatively simple. The charge present at a capacitor is a linear function of the voltage. Thus, dropping the voltage to zero is sufficient to remove the charge from the capacitor.

When a current source is used, management of charge is not so simple. This is because the charge on a pump capacitor is related to an integral of the current, and not to the instantaneous value of current.

On Nov. 8, 2012, Patent Publication WO 2012/151466, which is incorporated herein by reference, made public configurations of charge pumps in which one terminal was connected to a regulator. Because of its inductor, and because of the relevant time scales associated with the switches involved, as far as these charge pump configurations are concerned, the regulator behaved like a current source. This made management of how much charge is in the pump capacitors more challenging.

SUMMARY

The inventive subject matter described herein relates to stabilizing a charge pump coupled with a current source or load by ensuring that each pump capacitor of the charge pump begins a cycle in the same condition for every cycle. This avoids charge accretion that occurs when residual charge from the end of a first cycle is added to the beginning of a second cycle, thus causing the voltage of the capacitor to drift over time.

In one aspect, the invention features an apparatus comprising a charge pump having a capacitor array, a switch circuit, a first terminal, a second terminal connected to a circuit, and a controller. first and second currents flow between the charge pump and the circuit during respective first and second residence times of the charge pump. Based on a feedback measurement from the charge pump, the controller adjusts the first and second currents.

In some embodiments, the controller controls accumulation of charge within the charge pump by controlling current between the charge pump and the circuit.

In other embodiments, the controller adjusts the first and second currents in an attempt to cause a difference between charge transferred between the load and the charge pump during the first residence time and charge transferred between the load and the charge pump during the second residence time to remain constant.

Also among the embodiments are those in which the controller is configured to modulate a duty cycle of a switch during the first and second residence times. This switch selectively enables and suppresses charge transfer between the circuit and the charge pump.

In yet other embodiments, the controller adjusts the first and second currents by causing current to flow only during a selected portion of the first residence time and a selected portion of the second residence time.

Additional embodiments include those in which the feedback measurement from the charge pump that the controller uses when adjusting the first and second currents is a measurement made at the second terminal.

Further embodiments include those in which the controller adjusts the first and second currents in an effort to maintain a constant interstate differential.

In still other embodiments, the controller adjusts the first and second currents in an effort to maintain a constant interstate differential and a constant interstate summation.

Among the embodiments are those in which the controller adjusts the first and second currents in an effort to maintain a constant interstate differential and to cause the circuit to maintain a constant average voltage.

Other embodiments include those in which the controller modulates the feedback measurement with a periodic signal that is harmonically related to a frequency that is the reciprocal of the duration of a charge pump cycle that includes the first and second residence times. This results in adjusting the first and second currents.

In other embodiments, the controller causes the first current to flow during a time that is shorter than the first residence time.

Additional embodiments include those in which the controller actually suppresses charge transfer between the charge pump and the circuit during a residence time in which the charge pump is otherwise ready to engage in charge transfer with the circuit.

In yet other embodiments, the controller uses a feedback signal to attempt to maintain a constant average voltage and offsets the feedback control signal by different amounts at different times prior to using the feedback control signal to attempt to maintain the constant average voltage.

In still other embodiments, the controller uses a feedback signal to attempt to maintain a constant average voltage and causes a time-varying offset between the feedback control signal and a signal that is indicative of operation of a switch in the circuit.

In some embodiments, the controller receives a first signal for providing a basis for the controller to modulate a duty cycle of a switch that connects the charge pump to the circuit to achieve a constant interstate differential within the charge pump and a second signal for providing a basis for modulating the duty cycle to cause the power converter to maintain a constant average voltage. In such embodiments, the controller further includes a modulator for modulating the first signal with a periodic waveform thereby generating a modulated first signal and uses that the modulated first signal to create a time-varying offset relative to the second signal.

In still other embodiments, the controller relies upon a feedback signal to maintain a constant average voltage of the power converter and modulates a signal received from the charge pump to generate a time-varying signal and to overlay the time-varying signal on the feedback signal.

In yet other embodiments, the controller introduces a time-varying offset in an effort to cause the power converter to maintain a constant average voltage. In such embodiments, for modulating a duty cycle of a switch in an effort to maintain a constant average voltage of the power converter, the controller relies upon a difference between a feedback signal and a signal indicative of operation of the switch and then introduces a time-varying offset into the difference.

Also among the embodiments are those in which the controller receives a first signal and a second signal. The first signal provides a basis for the controller to modulate a duty cycle of a switch that connects the charge pump to the circuit to achieve a constant interstate differential within the charge pump. The second signal provides a basis for modulating the duty cycle to cause the power converter to maintain a constant average voltage. In these embodiments, the controller also includes a modulator, a comparator, and an adder. The modulator modulates the first signal with a periodic waveform, thereby generating a modulated first signal. The adder offsets the second signal by the modulated first signal, thereby generating an offset signal. The comparator compares the offset signal with a signal indicative of operation of the switch and outputs a duty-cycle control signal based on the comparison.

In other embodiments, the controller receives first and second signals. The first signal provides a basis for the controller to modulate a duty cycle of a switch that connects the charge pump to the circuit to achieve a constant interstate differential within the charge pump. The second signal provides a basis for modulating the duty cycle to cause the power converter to maintain a constant average voltage. In these embodiments, the controller includes a modulator, an adder, and a comparator. The modulator modulates the first signal with a periodic waveform thereby generating a modulated first signal and the adder offsets a signal indicative of operation of the switch by the modulated first signal. The comparator compares the offset signal with the second signal and outputs a duty-cycle control signal based on the comparison.

These and other features of the invention will be apparent from the following detailed description, and the accompanying drawings, in which:

DETAILED DESCRIPTION

Figure 1:
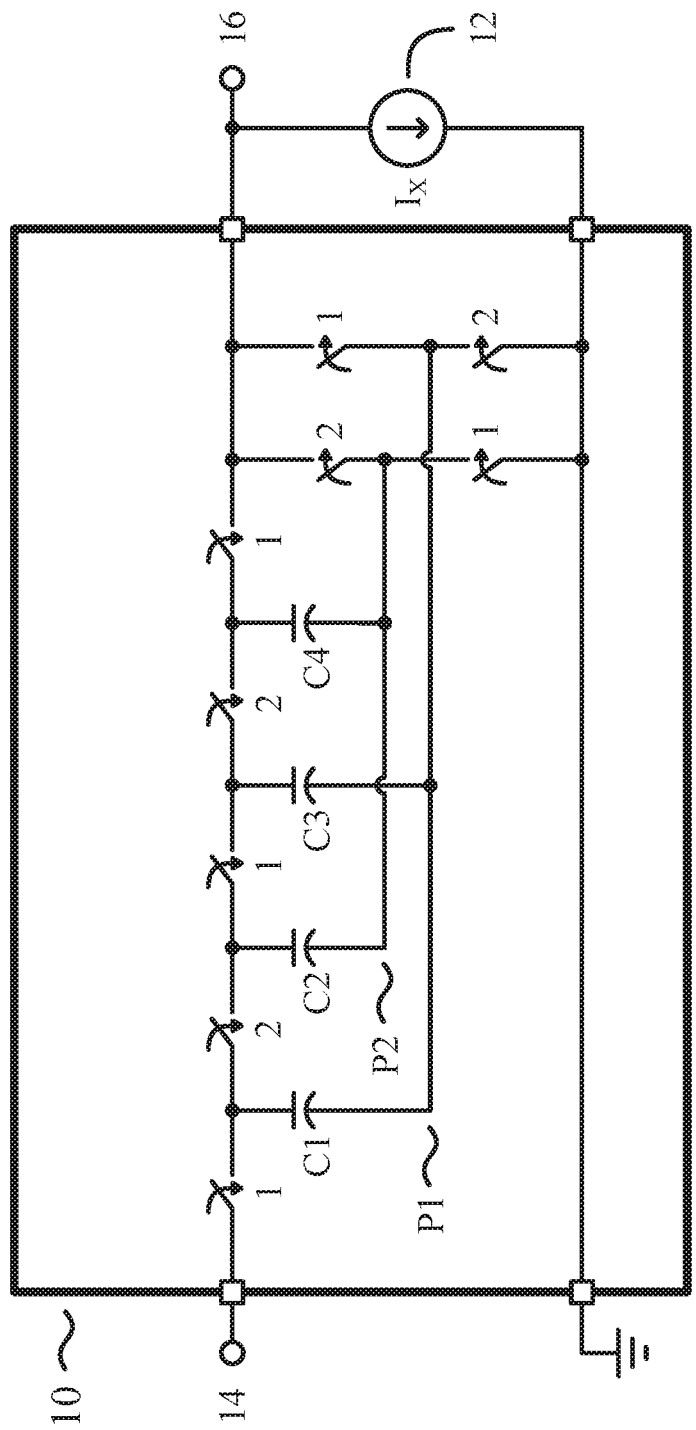
FIG. 1 shows a single-phase charge pump.

FIG. 1 shows a first example of a charge pump 10 coupled to a load circuit 12 that is modeled as an ideal current source IX. The charge pump 10 is a multi-stage charge pump, also known as a cascade multiplier. Although the current source IX is shown as drawing current from the charge pump 10, this distinction amounts to a mere sign change. The important feature of a current source IX is that it relentlessly drives a constant flow of current.

Throughout this specification, reference will be made to a "current source." As is well known, an ideal "current source" is an abstraction used for circuit analysis that does not in fact exist. However, for the time scales of interest, there are a variety of devices that effectively function as a current source. Examples include regulators, such as linear regulators, DC motors, depending on the load, and an IDAC, which is an active circuit that sets the current through LEDs. Thus, throughout this specification, "current source" or "current load" is understood to mean real devices, including but not limited to those enumerated herein, that effectively function as a current source.

The load circuit 12 can be viewed as drawing or providing a non-zero constant current, or a pulsed current that alternates between two values, one of which can be zero. Charge transfer occurs whenever the current through the load circuit 12 is non-zero. When the current is non-zero and constant, the charge transfer will be referred to as "soft charging," or "adiabatic charging."

The charge pump 10 has first and second terminals 14, 16. One terminal is a high-voltage terminal that carries a low current. The other terminal is a low-voltage terminal that carries a high current. In the particular example described herein, the second terminal 16 is the low-voltage terminal. However, in other embodiments, the second terminal 16 is the high-voltage terminal.

Between the terminals 14, 16 are four identical pump capacitors: outer pump capacitors C1, C4 and inner pump capacitors C2, C3. A first phase-node P1 couples with the negative terminal of the first and third pump capacitors C1, C3, and a second phase-node P2 couples with the negative terminal of the second and fourth pump capacitors C2, C4.

Figure 2:
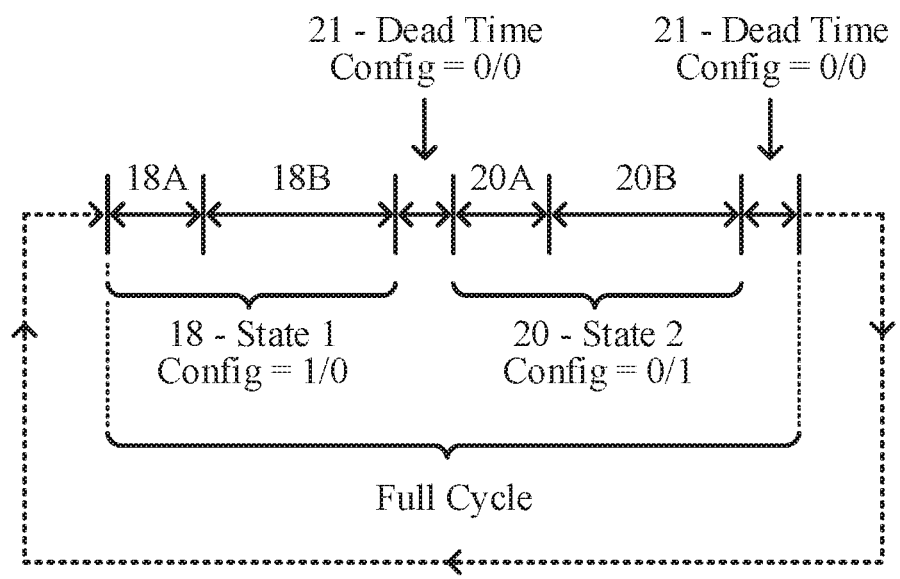
FIG. 2 shows a time-line associated with the operation of the single-phase charge pump of FIG. 1.

A first switch-set 1 and a second switch-set 2 cooperate to cause the charge pump 10 to reconfigure the pump capacitors C1-C4 between first and second pump-states 18, 20 as shown in FIG. 2. Through operation of the first and second switch-sets 1, 2, the charge pump 10 maintains a transformation ratio M:N between the voltages at the first and second terminals 14, 16. In the particular charge pump 10 shown in FIG. 1, the transformation ratio is 5:1.

In operation, the charge pump 10 executes a series of charge-pump cycles. Each charge-pump cycle has a first pump-state 18 and a second pump-state 20, as shown in FIG. 2. To transition from the first pump-state 18 to the second pump-state 20, the switches in the first switch-set 1 are opened and the switches in the second switch-set 2 are closed. Conversely, to transition from the second pump-state 20 into the first pump-state 18, the switches in the first switch-set 1 are closed and the switches in the second switch-set 2 are opened.

FIG. 2 shows the configuration of the switches as "Config X/Y" where X and Y are binary variables that indicate the disposition of the switches in the first and second switch-sets 1, 2 respectively. A binary zero indicates that the switches in a particular switch-set are open and a binary one indicates that the switches in a particular switch-set are closed.

During the first pump-state 18, the switches in the first switch-set 1 are all closed and the switches in the second switch-set 2 are all opened. The first pump-state 18 consists of a first pump-state redistribution interval 18A and a first pump-state steady-state interval 18B.

The first pump-state 18 begins with the opening of the switches in the second switch-set 2 and the closing of the switches in the first switch-set 1. This begins a first pump-state redistribution interval 18A characterized by a rapid redistribution of charge. For a brief period, the current associated with this charge distribution dwarfs that associated with the current through the load circuit 12.

Eventually, the current associated with charge redistribution dies down and the charge pump 10 settles into a first pump-state steady-state interval 18B. During the first pump-state steady-state interval 18B, current through the charge pump 10 is dominated by the current through the circuit 12. The sum of the time spent in the first pump-state steady-state interval 18B and the first pump-state redistribution interval 18A is the first residence time.

During the second pump-state 20, the switches in the first switch-set 1 are all opened and the switches in the second switch-set 2 are all closed. The second pump-state 20 consists of a second pump-state redistribution interval 20A and a second pump-state steady-state interval 20B.

The second pump-state 20 begins with the closing of the switches in the second switch-set 2 and the opening of the switches in the first switch-set 1. This begins a second pump-state redistribution interval 20A characterized by a rapid redistribution of charge. For a brief period, the current associated with this charge distribution dwarfs that associated with the current through the circuit 12.

Eventually, the current associated with charge redistribution dies down and the charge pump 10 settles into a second pump-state steady-state interval 20B. During the second pump-state steady-state interval 20B, current through the charge pump 10 is once again dominated by the current through the load circuit 12. The sum of the time spent in the second pump-state steady-state interval 20B and the second pump-state redistribution interval 20A is the second residence time.

In the course of transitioning between the first and second pump-states 18, 20 the voltage at the first phase-node P1 alternates between ground and the voltage at the second terminal 16. Meanwhile, the voltage at the second phase-node P2 is 180 degrees out-of-phase with the first phase-node P1.

Between the first pump-state 18 and the second pump-state 20 there is a dead-time interval 21 during which both the switches in the first switch-set 1 and the switches in the second switch-set 2 are open. Although not, in principle, required, this dead-time interval is a practical necessity because switches do not transition instantaneously. Thus, it is necessary to provide a margin to avoid the undesirable result of having switches in the first and second switch-sets 1, 2 closed at the same time.

Figure 3:
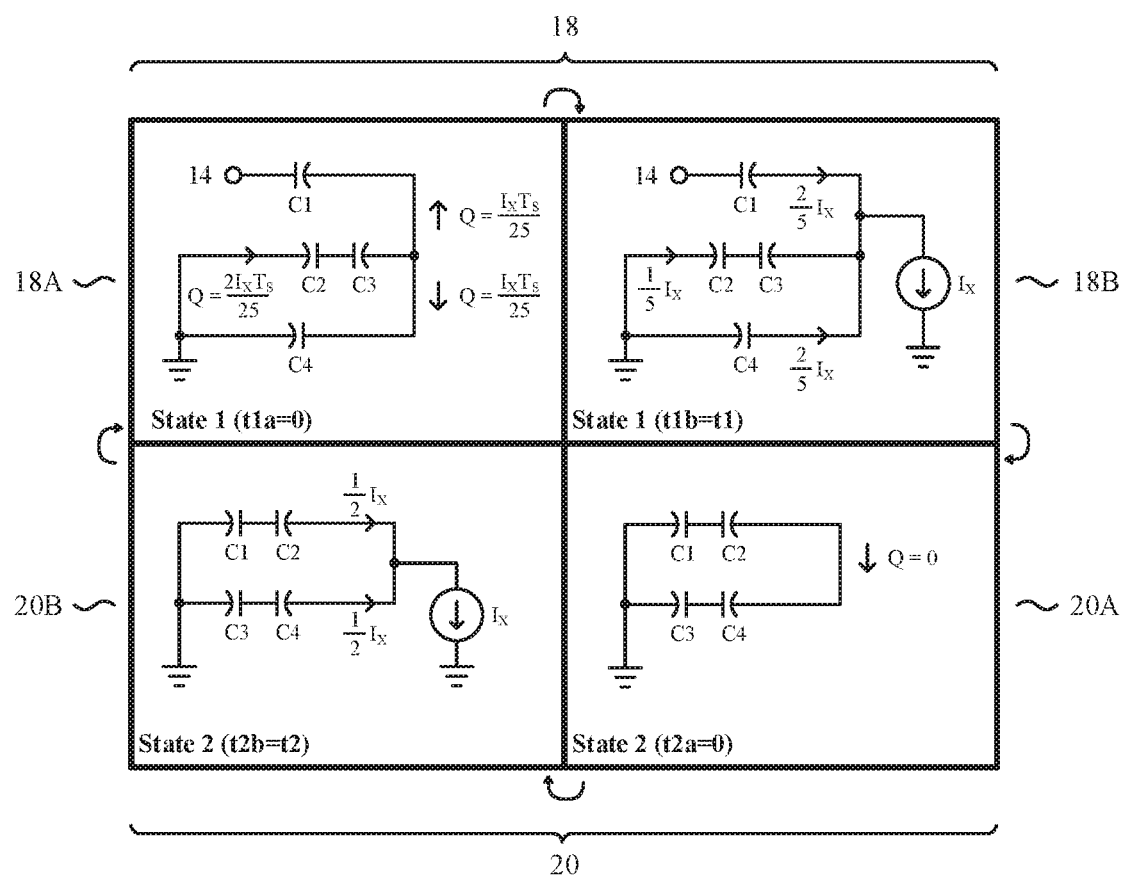
FIG. 3 shows circuit configurations associated with a cycle of the single-phase charge pump of FIG. 1.

To avoid having to introduce complexity that would only obscure understanding of the principles of operation, FIG. 3 shows currents passing through the pump capacitors C1-C4 in both the first and second pump-states 18, 20 assuming instantaneous charge-redistribution, no dead-time, and the same non-zero current, $I_x$, at the second terminal 16 in both pump-states.

In FIG. 3, the time spent in the first pump-state redistribution interval 18A is t1a; the time spent in the first pump-state steady-state interval 18B is t1b; the time spent in the second pump-state redistribution interval 20A is t2a; and the time spent in the second pump-state steady-state interval 20B is t2b. Lastly, the total length of one cycle is tsw. The first residence time is therefore t1a+t1b; and the second residence time is t2a+t2b. The assumption of instantaneous charge redistribution is manifested by setting t1a and t2a to zero, resulting in tsw being equal to t1b+t2b.

During the first pump-state's steady-state interval 18B, the outer pump capacitors C1, C4 carry a current having a magnitude of $0.4 \cdot I_x$ while the inner pump capacitors C2, C3 carry a current having half of the magnitude carried by the outer pump capacitors C1, C4. This is because the inner pump capacitors C2, C3 are in series and the outer pump capacitors C1, C4 are by themselves.

During the second pump-state's steady-state interval 20B, each outer pump capacitor C1, C4 is placed in series with one of the inner pump capacitors C2, C3, respectively. As a result, each pump capacitor C1-C4 carries a current with magnitude $0.5 \cdot I_x$. Note that the inner pump capacitors C2, C3 are always in series with another pump capacitor, whereas the outer pump capacitors C1, C4 are only in series with another pump capacitor during one pump-state.

In the limiting case, where charge is redistributed instantly, the current sources can be removed during the first and second pump-state redistribution intervals 18A, 20A as in FIG. 3. The amount of charge that is redistributed depends upon the voltages across the pump capacitors C1-C4 prior to a pump-state change.

In general, it is desirable that the net change of charge stored in any pump capacitor C1-C4 be zero during the course of a particular cycle. Otherwise, the level of charge present in the pump capacitors C1-C4 will tend to change over several cycles. This change can ultimately lead to instability.

Since the quantity of charge transferred is the product of current and the amount of time the current flows, it follows that one can control the quantity of charge transferred to a pump capacitor C1-C4 in any portion of the cycle by controlling the amount of time that the charge pump 10 spends in that portion of the cycle. This provides a way to ensure that the net charge change at each pump capacitor C1-C4 is zero during one cycle of the charge pump 10.

If the above constraint is applied to each distinct capacitor current in a charge pump 10, it is possible to generate a system of linear equations in which the times spent in each pump-state are the unknowns. The solution to that system will be the residence times for each pump-state 18, 20 that avoid instability.

To avoid instability in this example, assuming instantaneous charge redistribution, the first residence time should be (3/5)·tsw and the second residence time should be (2/5)·tsw. This results in an equal amount of charge being transferred from inner pump capacitors C2, C3 to the first pump capacitor C1 and to the fourth pump capacitor C4 during the first pump-state redistribution interval 18A; and zero redistribution charge during the second pump-state redistribution interval 20A.

Solutions for various transformation ratios M:N are shown below in tabular form:

| M:N | First residence time (sec) | Second residence time (sec) |
|---|---|---|
| 3:1 | 2/3 · tsw | 1/3 · tsw |
| 4:1 | 1/2 · tsw | 1/2 · tsw |
| 5:1 | 3/5 · tsw | 2/5 · tsw |
| 6:1 | 1/2 · tsw | 1/2 · tsw |
| 7:1 | 4/7 · tsw | 3/7 · tsw |
| 8:1 | 1/2 · tsw | 1/2 · tsw |
| 9:1 | 5/9 · tsw | 4/9 · tsw |

Although there is no guarantee that every topology will have a solution, in the case of charge pumps like that in FIG. 1, a solution exists. As a result of symmetry in current flow during the first and second pump-state redistribution intervals 18A, 20A, the solution for cases in which the transformation ratio is 2 k:1 for a positive integer k, the first and second residence times will be equal. Additionally, when M is odd and N is 1, the first residence time is tsw·(M+1)/2M while the second residence time is tsw·(M−1)/2M.

Figure 4:
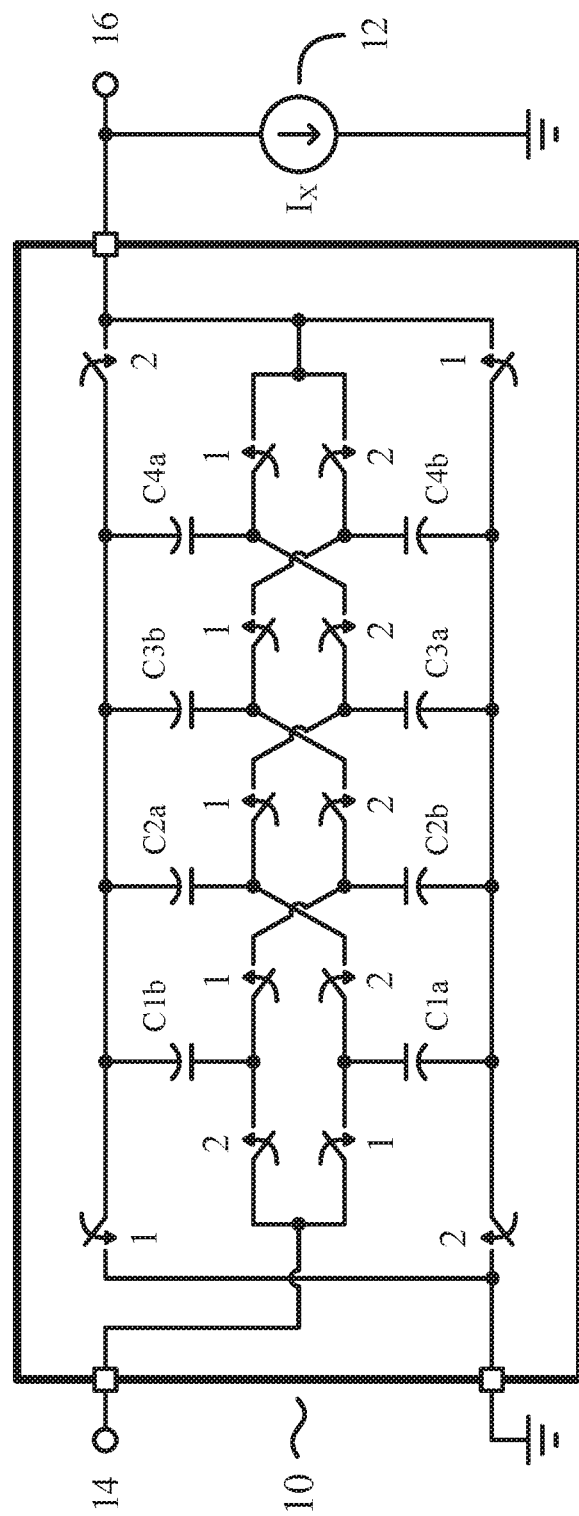
FIG. 4 shows a two-phase charge pump.
Figure 5:
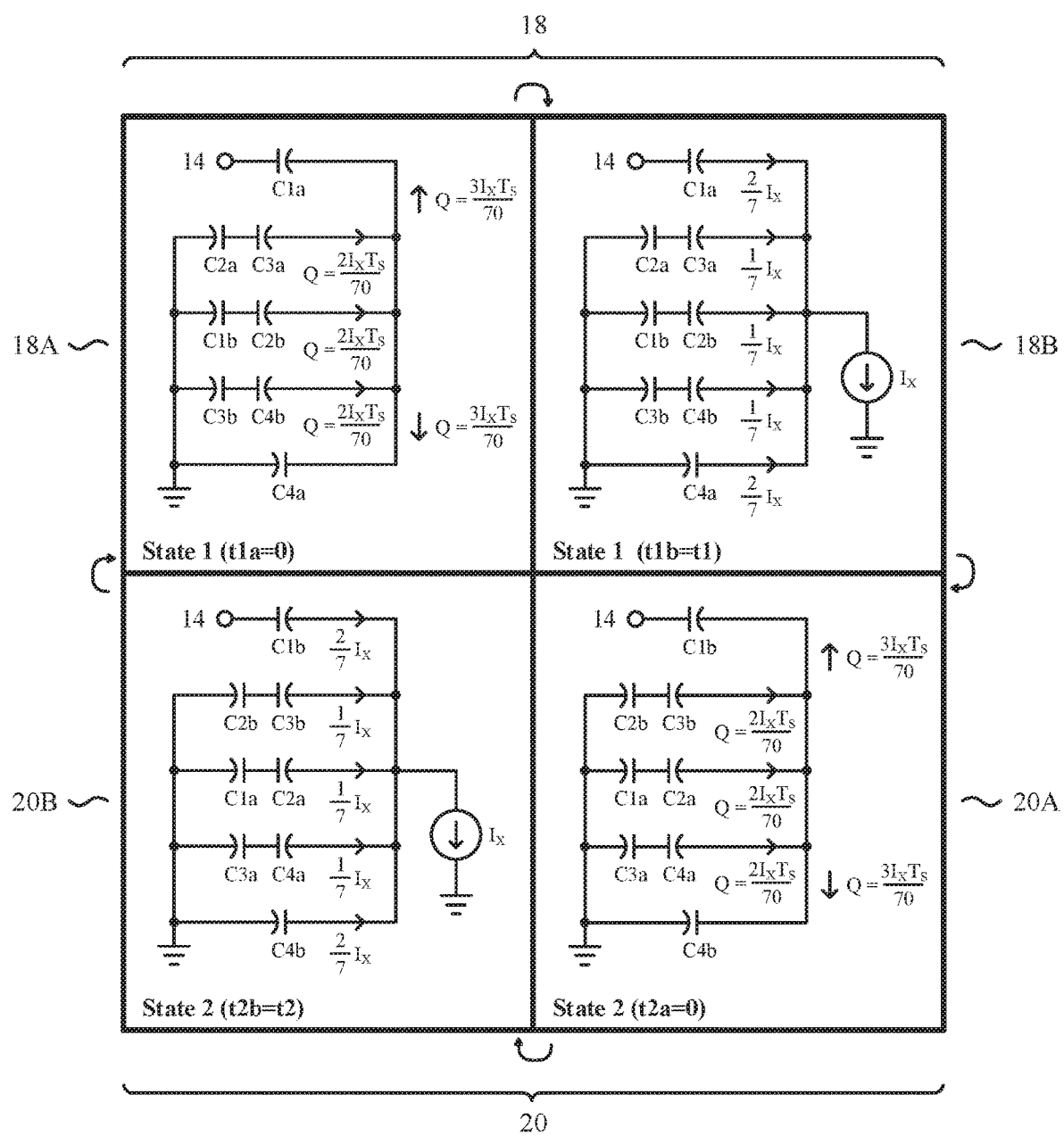
FIG. 5 shows circuit configurations associated with a cycle of the two-phase charge pump of FIG. 4.

In the case of a two-phase charge pump 10, such as that shown in FIG. 4, the currents in the first and second pump-state redistribution intervals 18A, 20A are inherently symmetric, as shown in FIG. 5. Hence, the first and second pump-state residence times are equal, unlike in the single-phase charge pump 10 shown in FIG. 1, even though both charge pumps have the same transformation ratio M:N.

In general, the first and second pump-state residence times, in the case of charge pumps like that in FIG. 4, will be equal for any transformation ratio k:1, where k is a positive integer. This inherent symmetry provides two-phase charge pumps with an advantage over single-phase charge pumps when it comes to stability.

However, analysis based on principles of linear circuit theory is based on an idealization of the circuit. In practice, for example, due to differences in the capacitances of the various pump capacitors C1-C4 of FIG. 1, difference in circuit resistances, (e.g., through transistor switches and/or signal traces), or inexact timing of the pump-state durations, it can be difficult to manage charge accretion/depletion in the pump capacitors C1-C4.

Figure 6:
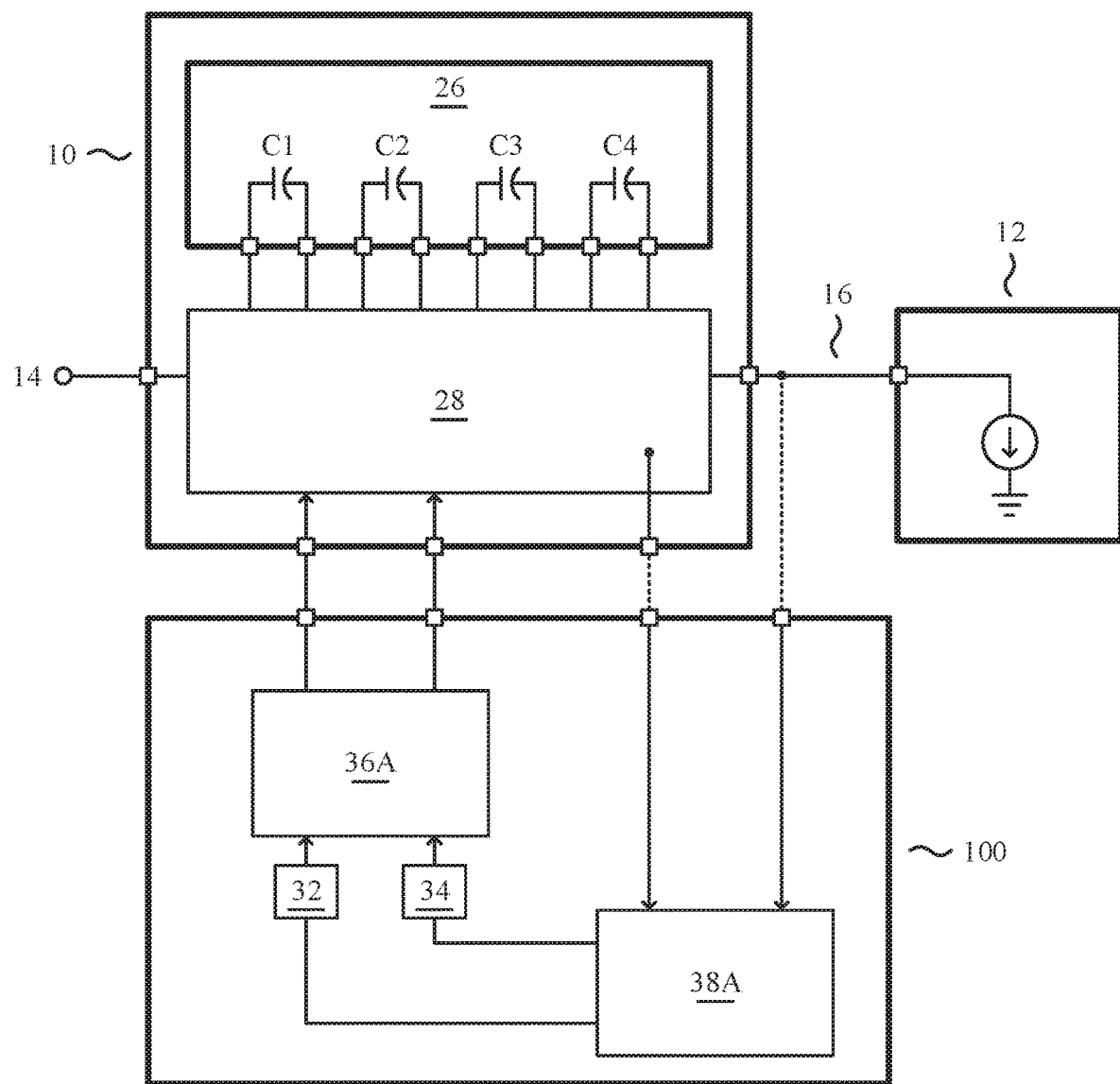
FIG. 6 shows a first controller for controlling pump-state residence times in the charge pump of FIG. 1.

One method for managing charge accretion/depletion is to use feedback to control the residence times. FIG. 6 shows an apparatus to carry out such control.

For convenience in discussion, FIG. 6 shows the charge pump 10 as divided into a capacitor array 26 and a switch circuit 28. The capacitor array 26 includes the pump capacitors C1-C4 and the switch circuit 28 includes the first and second switch-sets 1, 2.

A first controller 100 identifies suitable residence times for each pump-state and stores those in first and second residence-time buffers 32, 34. At appropriate times, a first timing-circuit 36A, which includes a clock to keep time, reads the residence-time buffers 32, 34 and causes the switches in the switch circuit 28 to transition at appropriate times.

To determine the correct values of the residence times, the first controller 100 includes a first feedback-circuit 38A. In general, a feedback circuit will have a measured variable and a manipulated variable that is to be manipulated in response to the measured variable in an effort to achieve some set point. For the first feedback-circuit 38A, the manipulated variable is the pair of residence times and the measured variable includes a voltage measured at the second terminal 16. Optionally, the measured variable for the first feedback-circuit 38A includes measurements obtained from within the charge pump 10, hence the dotted lines within FIG. 6.

Examples of such measurements include voltages across the switches in the first and second switch-sets 1, 2 or across pump capacitors C1-C4.

In one embodiment, the first feedback-circuit 38A determines values of residence time based on measurements taken over a sequence of cycles. The manipulated variable of the first controller 100 is chosen based on historical values. A suitable first controller 100 is a PID (proportional-integral-derivative) controller.

An advantage of the first controller 100 shown in FIG. 6 is that the frequency of the charge pump 10 is fixed. Another embodiment, shown in FIG. 7, features a second controller 101 that is configured to determine residence time values based on measurements obtained during the current cycle only. This allows residence time values to be determined on a cycle-by-cycle basis. As a result, the cycle length of the charge pump 10 can vary when using the second controller 101.

The second controller 101 includes a second timing-circuit 36B that is similar to first timing-circuit 36A described in FIG. 6. However, the second feedback-circuit 38B is implemented as a threshold logic circuit that relies on comparing voltages.

A second timing-circuit 36B provides state control signals to the switch circuit 28. During normal operation, the second timing-circuit 36B causes transitions between the first and second pump-states 18, 20 using nominal first and second residence times. The nominal residence times can be based on circuit analysis assuming ideal circuit elements.

The second timing-circuit 36B also includes first and second skew-inputs 44, 46 to receive corresponding first and second skew signals 48, 50 from the second feedback-circuit 38B. The second feedback-circuit 38B asserts one of the first and second skew signals 48, 50 to prematurely force the charge pump 10 to change pump-states. The second feedback-circuit 38B makes the decision to assert one of the first and second skew signals 48, 50 based on feedback from one or more sources. This feedback includes measurements of electrical parameters made at one or more of: the first terminal 14, the second terminal 16, inside the switch circuit 28, and inside the capacitor array 26.

If the second feedback-circuit 38B does not assert either skew signal 48, 50, then the second timing-circuit 36B causes the charge pump 10 to transition between its first and second pump-states 18, 20 according to the nominal first and second residence times. If, while the charge pump 10 is in the first pump-state 18, the second feedback-circuit 38B presents an asserted first skew-signal 48 to the first skew-input 44, the second timing-circuit 36B immediately causes the charge pump 10 to transition from the first pump-state 18 to the second pump-state 20. Conversely, if the second feedback-circuit 38B presents an asserted second skew-signal 50 to the second skew-input 46 while the charge pump 10 is in the second pump-state 20, the second timing-circuit 36B immediately causes the charge pump 10 to transition from the second pump-state 20 to the first pump-state 18.

An advantage of the second controller 101 is that it reacts immediately on a cycle-by-cycle basis. This means that the capacitors inside the capacitor array 26 can be stabilized faster. In fact, since the second controller 101 operates by prematurely terminating charge pump-states 18, 20, the notion of a frequency is not well defined.

Note that shortening the first residence-time while keeping the second residence-time constant will generally result in an upward drift and/or a reduction in the amplitude of a lower excursion of voltage ripple present at the second terminal 16. Therefore, in one example, when the second feedback-circuit 38B detects either a downward drift in the average voltage at the second terminal 16 or an excessive lower excursion of the voltage ripple at the second terminal 16, it presents an asserted first skew-signal 48 to the first skew-input 44, thus truncating the first pump-state 18 and shortening the first residence time.

Conversely, in another example, upon detecting an upward drift and/or an excessive upward excursion of the ripple at the second terminal 16, the second feedback-circuit 38B presents an asserted second skew-signal 50 to the second skew-input 46, thereby truncating the second pump-state 20 and shortening the second residence time.

As noted above, the second feedback-circuit 38B receives measurements of electrical parameters from one or more locations. However, these measurements would be meaningless without some way for the second feedback-circuit 38B to know whether the measured values are normal or not. To remedy this, it is desirable to provide expected values of these electrical parameters.

The thresholds provided to the second feedback-circuit 38B can be derived in many ways. One way is through analysis of an ideal circuit corresponding to the charge pump 10. Another way is through simulation of a physical charge pump 10. Either of these techniques can be used to provide expected values for an average voltage at the second terminal 16 (e.g., as a multiple of the voltage present at the first terminal 14) and expected maximum and minimum values of voltage ripple about that average. The second feedback-circuit 38B uses such pre-computed values in setting the thresholds at which the skew signals 48, 50 are asserted. Similar logic can be used to implement the first feedback-circuit 38A discussed in connection with FIG. 6.

Figure 7:
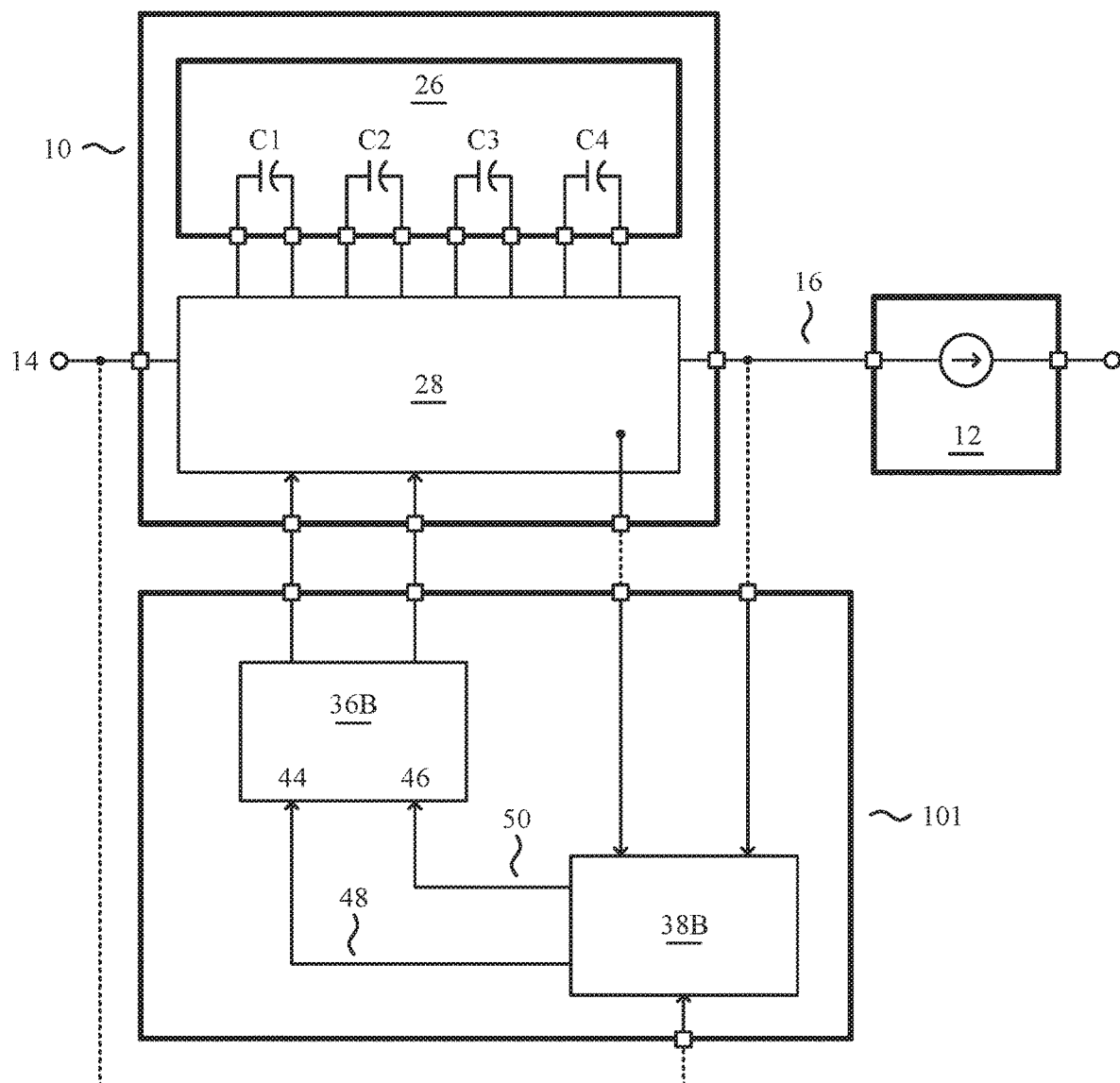
FIG. 7 shows a second controller for controlling pump-state residence times in the charge pump of FIG. 1.
Figure 8:
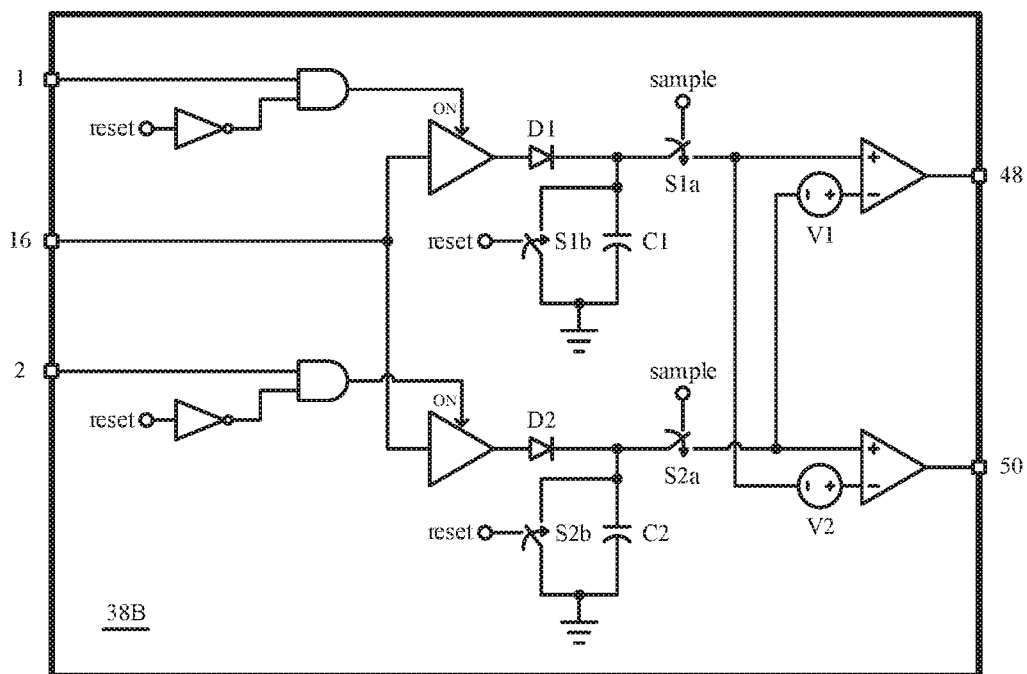
FIG. 8 shows an implementation of the second feedback-circuit in FIG. 7.

FIG. 8 shows an implementation of the second feedback-circuit 38B shown in FIG. 7 that limits the peaks not valleys. The illustrated feedback-circuit 38B uses first and second peak-detectors to sense the peak voltage at the second terminal 16 during the first and second pump-states 18, 20 respectively. The first peak-detector comprises a first voltage-buffer and a first diode D1. The second peak-detector comprises a second voltage-buffer and a second diode D2. The first peak-detector stores the peak voltage during the first pump-state 18 in a first peak-storage capacitor C1. The second peak-detector stores the peak voltage during the second pump-state 20 in a second peak-storage capacitor C2.

The stored peak voltages on the first and second peak-storage capacitors C1, C2 can then be connected to the inputs of corresponding first and second peak-voltage comparators by closing first and second switches S1a, S2a simultaneously. This compares the peak voltages that were stored on the first and second peak-storage capacitors C1, C2 during the preceding first and second pump-states 18, 20.

If the peak voltage during the first pump-state 18 exceeded that of the second pump-state 20 by a first threshold V1, then the first peak-voltage comparator asserts the first skew-signal 48. Conversely if the peak voltage during the second pump-state 20 exceeded that of the first pump-state 18 by a second threshold V2, then the second peak-voltage comparator asserts the second skew-signal 50.

The embodiment shown in FIG. 8 relies on the differential voltage between pump states in order to decide which of the first and second skew-signals 48, 50 should be asserted. In particular, each of the first and second peak-voltage comparators uses the difference between the voltages that occur during the first and second pump states to decide whether or not to assert its corresponding skew signal 48, 50.

An alternative embodiment relies on the absolute value of a voltage measured during a pump state rather than on the difference between voltages measured during the first and second pump states. Such an embodiment only requires one peak-voltage comparator, an input of which connects instead to a reference voltage. As a result, in such an embodiment, whether or not the remaining comparator asserts its skew signal 48, 50 no longer depends on the differences between voltages associated with the first and second pump states. Instead, the comparator asserts its corresponding skew-signal 48, 50 based on whether the absolute value of the voltage measured during the relevant pump state exceeds a particular reference value. Such a configuration is simpler to implement and provides adequate control. The simplicity of implementation arises in part from the ability to eliminate a comparator and to eliminate sample-and-hold circuitry that would otherwise be necessary.

Figure 9:
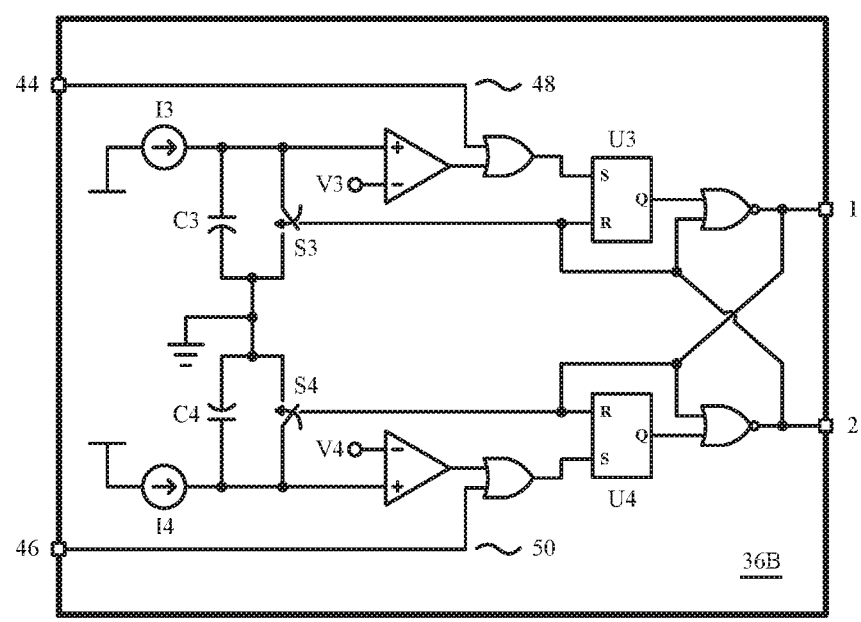
FIG. 9 shows an implementation of the second timing circuit in FIG. 7.

The first and second skew-signals 48, 50 from the second feedback-circuit 38B make their way to the second timing-circuit 36B, an implementation of which is shown in FIG. 9. The second timing-circuit 36B uses these first and second skew-signals 48, 50 to generate non-overlapping signals that control the first and second switch-sets 1, 2. In the illustrated embodiment, there is no gap between the two pump-states 18, 20. The first pump-state 18 starts upon a transition from the second pump-state 20, and vice-versa.

In operation, the circuit shown in FIG. 9 begins the first pump-state 18 by closing a first switch S4. This resets a first timing-capacitor C4 to be low. Meanwhile, a first SR latch U4 is in the reset state. During the first pump-state 18, an open second switch S3 allows a first bias-current 13 to charge a second timing-capacitor C3. Eventually, the first bias-current 13 will have deposited enough charge in the second timing-capacitor C3 to raise its voltage beyond a first voltage-threshold V3 at the input of a first voltage comparator. When this happens, the first voltage comparator outputs a logical high. This, in turn, sets a second SR latch U3, thus terminating the first pump-state 18. Thus, in the absence of an asserted first skew-signal 48, the residence time of the first pump-state 18 depends upon the first bias-current 13, the capacitance of the second timing-capacitor C3, and the first voltage-threshold V3.

Upon terminating the first pump-state 18, the second pump-state 20 begins. The operation during the second pump-state 20 is similar to that described above for the first pump-state 18.

At the start of the second pump-state 20, the first switch S4 opens, thus allowing a second bias-current 14 to charge the first timing-capacitor C4. Eventually, the second bias-current 14 will have deposited enough charge in the first timing-capacitor C4 to raise its voltage past a second voltage-threshold V4 at the input of a second voltage comparator. In response to this, the second voltage comparator outputs a logical high that sets the first SR latch U4, thus terminating the second pump-state 20. During the second pump-state 20, the second timing-capacitor C3 is reset low when the second switch S3 is closed, and the second SR latch U3 is in the reset state. In the absence of an asserted second skew-signal 50, the residence time of the second pump-state 20 is set by the second bias-current 14, the capacitance of the first timing-capacitor C4, and the second voltage-threshold V4.

The first skew-signal 48 and the output of the first voltage comparator are inputs to a first OR-gate. Thus, the first pump-state 18 can be terminated in two ways. In the first way, already described above, the first pump-state 18 lasts for its nominal residence time and terminates once enough charge has accumulated in the second timing-capacitor C3. However, while the second timing-capacitor C3 is still being filled with charge, the second feedback-circuit 38B may assert the first skew-signal 48, thus bringing the first pump-state 18 to a premature end.

It will be apparent from the symmetry of the circuit shown in FIG. 9 that the second pump-state 20 can be truncated in the same way by assertion of the second skew-signal 50. The second feedback-circuit 38B is thus able to shorten the first residence time relative to the second by asserting the first skew-signal 48 but not the second skew-signal 50.

After each comparison of the peak voltage in the first and second pump-states 18, 20, the first and second peak-storage capacitors C1, C2 of the second feedback-circuit 38B are reset by closing third and fourth switches S1b, S2b and opening the first and second switches S1a, S2a. Also, the voltage buffers that sense the voltage at the second terminal 16 can be disabled or tri-stated while the first and second peak-storage capacitors C1, C2 are reset. Each sample-compare-reset cycle can occur once per charge pump cycle or once per set of multiple consecutive charge pump cycles.

In the methods described above, there have been only two pump-states 18, 20 and two residence times. However, the principles described are not limited to merely two pump-states 18, 20. For example, it is possible to implement a dead time interval during which the charge pump 10 is not doing anything. This dead time interval can be used in connection with the embodiment described in FIG. 7 to cause fixed frequency operation. To do so, the dead time interval is set to be the difference between a nominal charge pump period and the sum of the first and second pump-state intervals.

Figure 10:
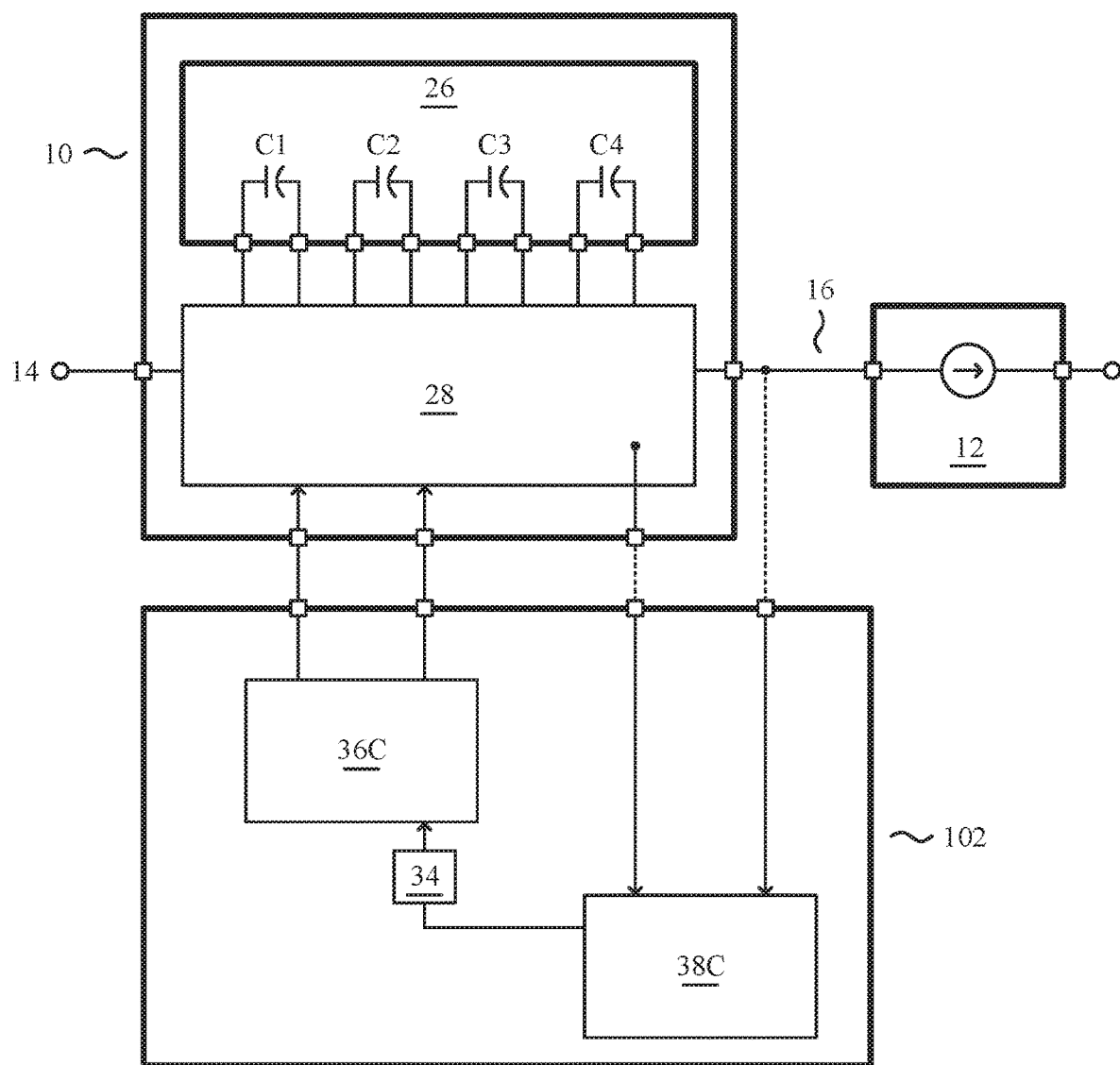
FIG. 10 shows a third controller for controlling pump-state residence times in the charge pump of FIG. 1

FIG. 10 shows one implementation for carrying out a three-state charge pump that defines a dead time as its third state. The embodiment shown in FIG. 10, features a third controller 102 that uses a third feedback-circuit 38C connected to a third timing-circuit 36C to exercise control over only a second residence time in the second residence-time buffer 34, and not the first residence time. In this embodiment, the first residence time is always set to some nominal value. The third controller 102 features an input from the switch circuit 28 that provides information on the state of the first switch-set 1. Based on this information, if the third controller 102 determines that the switches in the first switch-set 1 are open, it has two choices. The first choice is to close the switches in the second switch-set 2. This initiates the second residence time. The second choice is to leave the switches in the second switch-set 2 open. This initiates a dead-time interval. For proper operation, the first and second residence times must be non-zero.

The dead-time interval is an example of a third pump-state in which no charge transfer occurs. However, it is also possible to operate a charge pump in three or more states, each one of which permits charge transfer between capacitors. An example of such multi-state charge pump control is given in U.S. Provisional Application 61/953,270, in particular, beginning on page 11 thereof, the contents of which are herein incorporated by reference.

The rate at which charge accumulates on a capacitor depends on the current and the amount of time the current is allowed to flow. The methods disclosed thus far manage charge accumulation by controlling the second of these two parameters: the amount of time current is allowed to flow. However, it is also possible to control the first of these two parameters, namely the amount of current that flows. Embodiments that carry out this procedure are shown in FIGS. 11 and 12.

Figure 11:
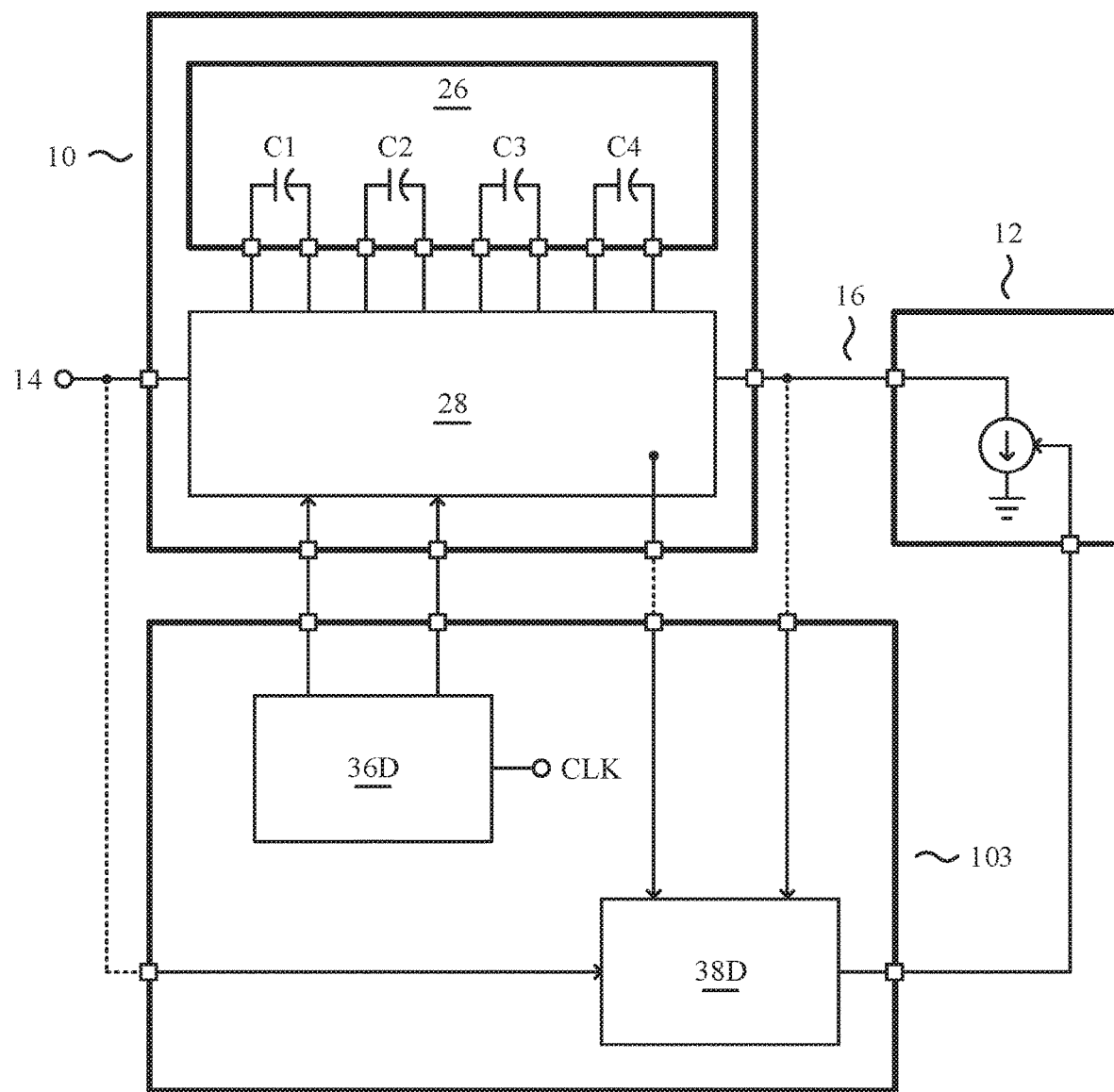
FIG. 11 shows a fourth controller for controlling current at a load.
Figure 12:
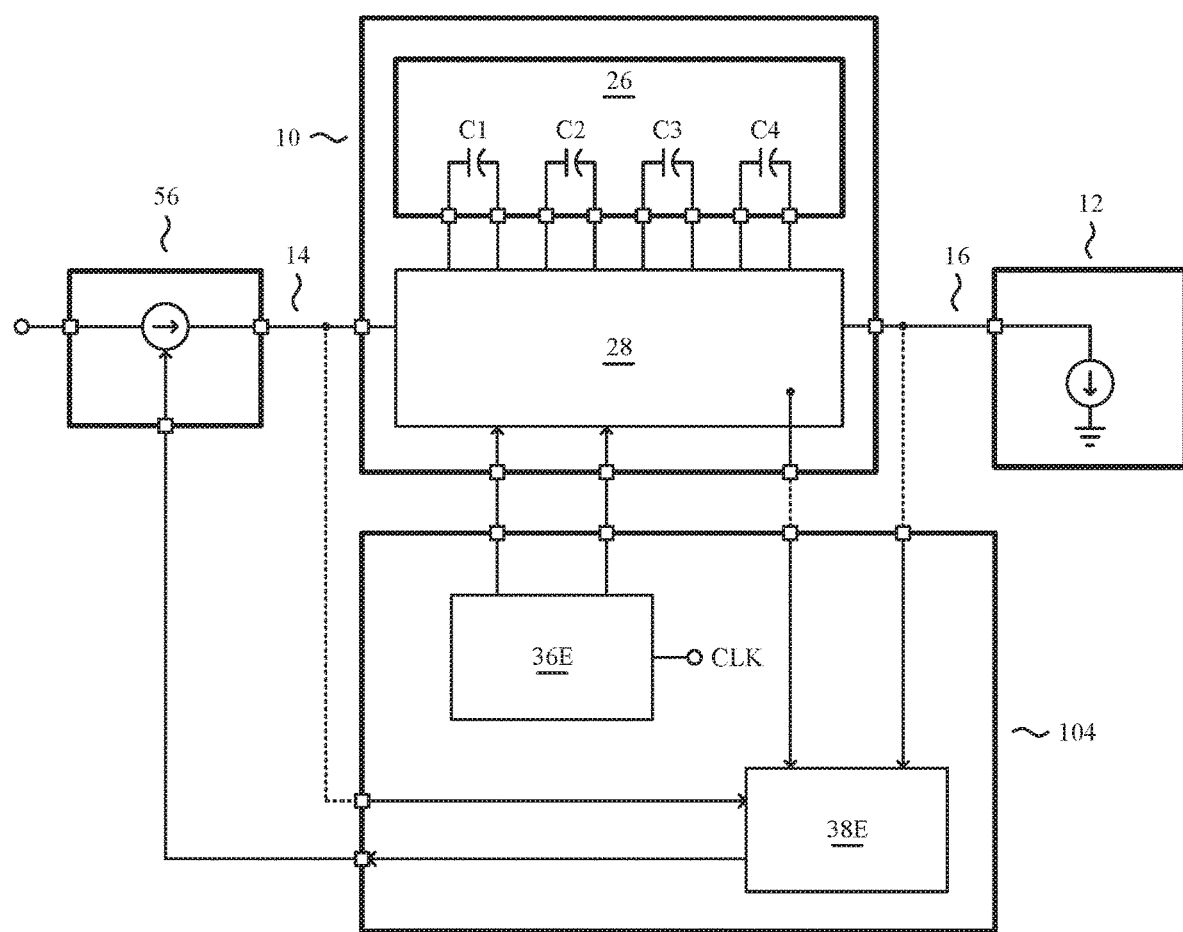
FIG. 12 shows a fifth controller for controlling current at a regulator.

FIG. 11 shows a fourth controller 103 similar to the second controller 101 shown in FIG. 7 but with no connection between a fourth feedback-circuit 38D and a fourth timing-circuit 36D. Thus, unlike the second controller 101, the fourth controller 103 does not vary the first and second residence times. Instead, the fourth feedback-circuit 38D of the fourth controller 103 adjusts the current drawn by the circuit 12 while allowing the first and second residence intervals to be derived from a constant clock signal CLK. The fourth feedback-circuit 38D makes the decision on an extent to which to vary the current drawn by the circuit 12 based on feedback measurements from one or more sources. These include measurements of electrical parameters made at one or more of the first terminal 14, the second terminal 16, inside the switch circuit 28, and inside the capacitor array 26.

FIG. 11 models the circuit 12 as a current source. Although an ideal current source exists only in theory, many real electrical components are modeled as behaving as a current source, at least at time scales of interest. This is particularly true in cases where the component has significant inductance because changing the current through an inductor involves integration of voltage over time. Examples of electrical components that are often modeled as a current source or as comprising a current source include regulators, such as switching regulators, DC motors and other circuits that include an inductance, and an IDAC, which is an active circuit that sets the current through light-emitting diodes.

During operation of the charge pump 10, there exists charge transfer between the charge pump 10 and the circuit 12. In some cases, this charge transfer arises because charge flows from the circuit 12 to the charge pump 10. In other cases, this charge transfer arises because charge flows from the charge pump 10 to the circuit 12. Since the circuit 12 can be viewed as the charge pump's load, this flow of charge, regardless of its direction, will be referred to herein as the "load current."

Each cycle includes two or more pump states. During each pump state, it is possible to transfer a bolus of charge. For simplicity, the case of a cycle with two states is described below. The general principle is, however, easily transferrable to the case in which a cycle has more than two states.

In the case of a cycle with two pump states, each cycle includes the transfer of two boluses of charge: a first charge bolus during the cycle's first pump state 18 and a second charge bolus during the cycle's second pump state 20. The amounts of charge in the first and second charge boluses are given respectively by the integrals of the load current during the first pump state 18 and during the second pump state 20.

The first and second boluses of transferred charge that arise during the course of one cycle do not necessarily have equal amounts of charge. The difference between the amounts of charge carried by the two boluses will be referred to herein as the "interstate differential" for that charge-pump cycle. The aggregate of the charge contained by the first and second boluses will be referred to as the "interstate sum" for that charge-pump cycle.

To discourage instability that may arise from charge accretion or depletion during multiple cycles, it is useful to control the interstate differential of each cycle. In the ideal case, assuming no variations in component values within the circuit, this interstate differential should remain zero for every cycle. However, to accommodate such variations that may have arisen as a result of manufacturing variations, varying environmental conditions during operation, such as temperature, or aging, there may be cases in which the differential should be maintained at some constant non-zero value.

Since the amounts of charge in the first and second bolus are what control the value of the interstate differential, a good way to control the value of the interstate differential is to control the amounts of charge contained in the first and second charge boluses.

One way to control the sizes of the first and second boluses is to control the load current that flows during each pump state. Thus, to make the first bolus have more charge, one increases the current that flows during the first pump state. To make the first bolus have less charge, one decreases the current that flows during the first pump state. An advantage of this approach is that the durations of the first and second pump states remain the same.

However, not all load currents are amenable to being controlled in this way.

An alternative way to control the amount of charge contained in the first and second charge boluses is to instead weight the load current by a weighting function. By properly controlling this weighting function, the net effect, at least as far as the charge pump 10 is concerned, will be similar to controlling the load current directly. In that case, the charge contained in each of the first and second boluses will be given by integrating the product of this weighting function and the load current.

One weighting function that is particularly easy to implement is a binary function that switches between being zero and unity. Implementations of this type of weighting function is described in connection with FIGS. 14 and 15.

FIG. 12 shows a fifth controller 104 that is similar to the fourth controller 103 except that instead of controlling current drawn by a circuit 12, the fifth controller 104 controls current through a regulator 56, which is modeled in the illustrated circuit as a current source. In the fifth controller 104, a fifth timing-circuit 36E responds only to a clock signal CLK. A fifth feedback-circuit 38E decides how much to vary the current through the regulator 56 based on feedback measurements from one or more sources. These include measurements of electrical parameters made at one or more of the first terminal 14, the second terminal 16, inside the switch circuit 28, and inside the capacitor array 26.

The control methods described above are not mutually exclusive. As such, it is possible to implement hybrid controllers that implement two or more of the control methods described above.

Figure 13:
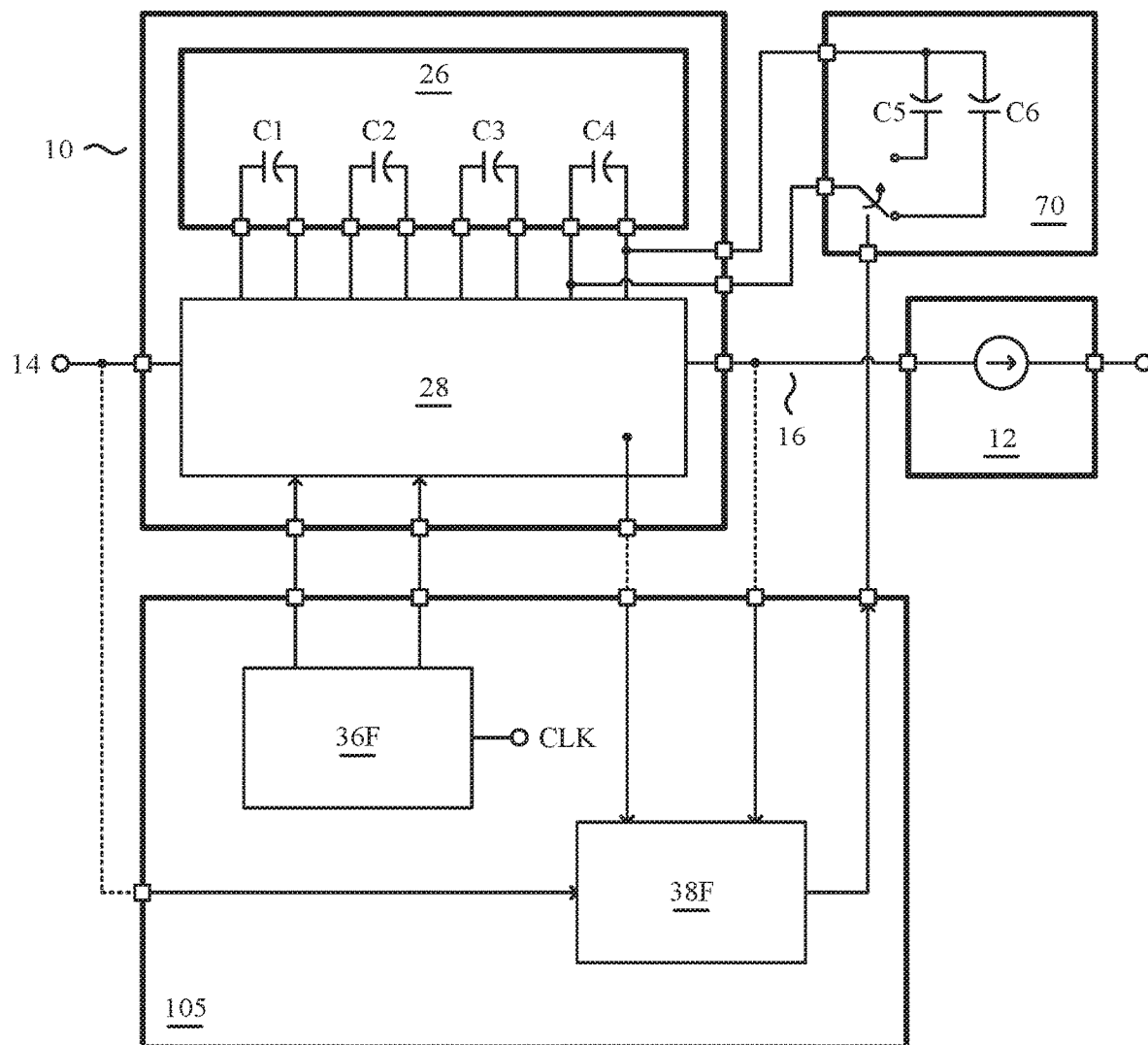
FIG. 13 shows a sixth controller that controls a switching network for attaining a desired capacitance for a pump capacitor in FIG. 1.

One reason that charge accretion/depletion becomes a problem is that, as a practical matter, it is next to impossible to manufacture pump capacitors C1-C4 that all have the same desired capacitance. Referring now to FIG. 13, a remedy for this is to compensate for an error in the value of a pump capacitor's capacitance by switching other capacitors in series or in parallel with that pump capacitor. These capacitors are referred to as "trim" capacitors because they trim a capacitance to a desired value. The term "trim" is not be construed as "reducing" but rather in the sense of making fine adjustments in any direction in an effort to attain a desired value. Capacitance of a pump capacitor can be raised or lowered by connecting another capacitor in parallel or in series respectively.

FIG. 13 shows a sixth controller 105 having a sixth timing-circuit 36F and a sixth feedback-circuit 38F. The sixth controller 105 connects to a trim-capacitor network 70 having two trim capacitors C5, C6, either one of which can be placed in parallel with the fourth pump capacitor C4.

Although only two trim capacitors C5, C6 are shown, a practical trim-capacitor network 70 has an assortment of capacitors with various values that can be selectively switched in series or in parallel with the fourth pump capacitor C4. The illustrated trim-capacitor network 70 is shown connecting one trim capacitor C6 in parallel with the pump capacitor C4, thus raising the effective capacitance of the combination. Only two trim capacitors C5, C6 are shown for clarity. However, it is a simple matter to add more, thus allowing greater variability in adjustment. In addition, for the sake of simplicity, the trim-capacitor network 70 shown only places trim capacitors C5, C6 in parallel. However, it is a relatively simple matter to design a circuit to switch trim capacitors C5, C6 in series with the fourth pump capacitor C4. Additionally, in FIG. 13, a trim-capacitor network 70 is shown only for the fourth pump capacitor C4. In practice, each pump capacitor C1-C4 would have its own trim-capacitor network 70.

By switching in the proper combination of trim capacitors in the trim-capacitor network 70, the overall capacitance of the pump capacitor C4 combined with that of the trim capacitors C5, C6 can be made to approach or even equal a target value. This trimming procedure may only need to be carried out once in the lifetime of the charge pump 10 or can be carried out during normal operation because the capacitance of practical capacitors normally varies with the voltage across their terminals as well as temperature.

Rather than being used once to adjust for manufacturing errors, a trim-capacitor network 70 as shown can also be used during operation of the circuit as a way to control the quantity of charge on a particular pump capacitor C4 by transferring charge between a particular capacitor, e.g. the pump capacitor C4, and some other charge repository, such as a trim capacitor C5, C6 within the trim-capacitor network 70, or to the ultimate repository, which is ground. This provides an alternative way to adjust the charge on each capacitor in an effort to restore all pump capacitors to their respective initial voltages at the start of a charge pump cycle.

Alternately, a current sink could be coupled to each pump capacitor C1-C4 allowing it to bleed any excess charge to another location or multiple locations, such as the first terminal 14, the second terminal 16, a terminal inside the switch circuit 28, a terminal inside the capacitor array 26, and even ground.

Figure 14:
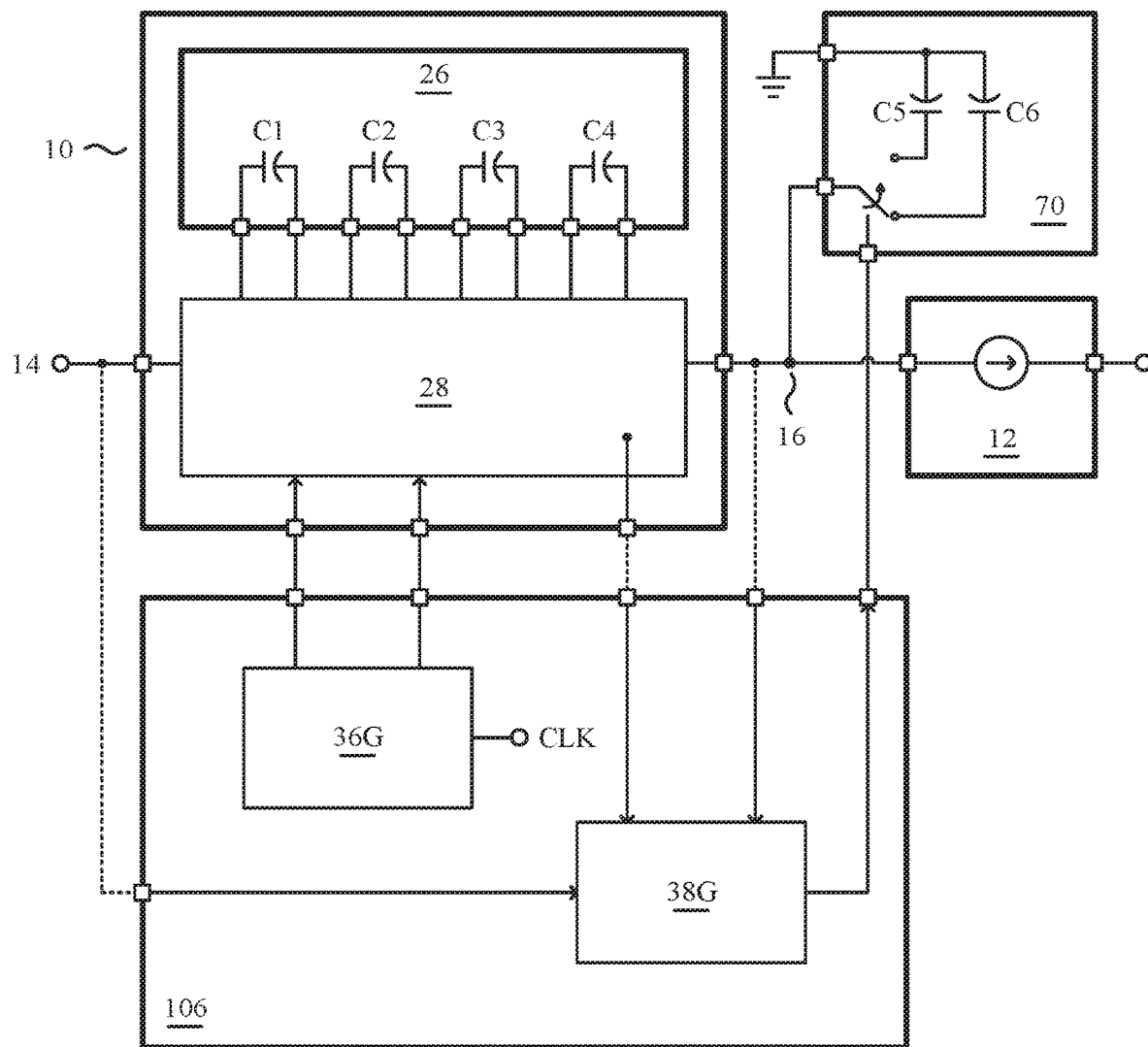
FIG. 14 shows a seventh controller that controls a switching network for attaining a desired stabilization capacitance.

FIG. 14 shows another use for the trim-capacitor network 70. In FIG. 14, a seventh controller 106 having a seventh timing-circuit 36G and a seventh feedback-circuit 38G causes the trim-capacitor network 70 to act as a stabilizing capacitance between the charge pump 10 and the circuit 12. To reduce losses, the stabilizing capacitance is preferably just sufficient to stabilize the charge pump 10. A larger stabilizing capacitance value than necessary may increase power loss during charge pump operation. Because of manufacturing tolerances, it will, in general, not be possible to either predict the required value of the stabilizing capacitance or, even if a prediction were available, to ensure that it has the required value over all operating conditions. Thus, one can use a technique similar to that described in connection with FIG. 13 to switch a selected trim capacitor C5, C6 from the trim-capacitor network to act as a stabilizing capacitance.

The embodiment shown in FIG. 14 also provides a way for the seventh controller 106 to control the sizes of the first and second charge boluses. For example, if, during the first pump state 18, the switch connected to the second terminal 16 remains open, then charge has no place to flow other than between the charge pump 10 and the circuit 12. As a result, it becomes part of the first bolus. Once that switch closes, the relevant trim capacitor C6, C7 begins to sink charge. This charge no longer contributes to the first bolus.

Eventually, the trim capacitors C6, C7 will no longer sink charge and charge will once again flow between the charge pump 10 and the circuit 12. To extend the time during which the trim capacitors C6, C7 can sink charge that would otherwise be transferred between the charge pump 10 and the circuit 12, it is possible to increase the capacitance of one or both trim capacitors C6, C7. Or, in the limit, it is possible to eliminate them altogether and sink the charge to ground instead.

Figure 15:
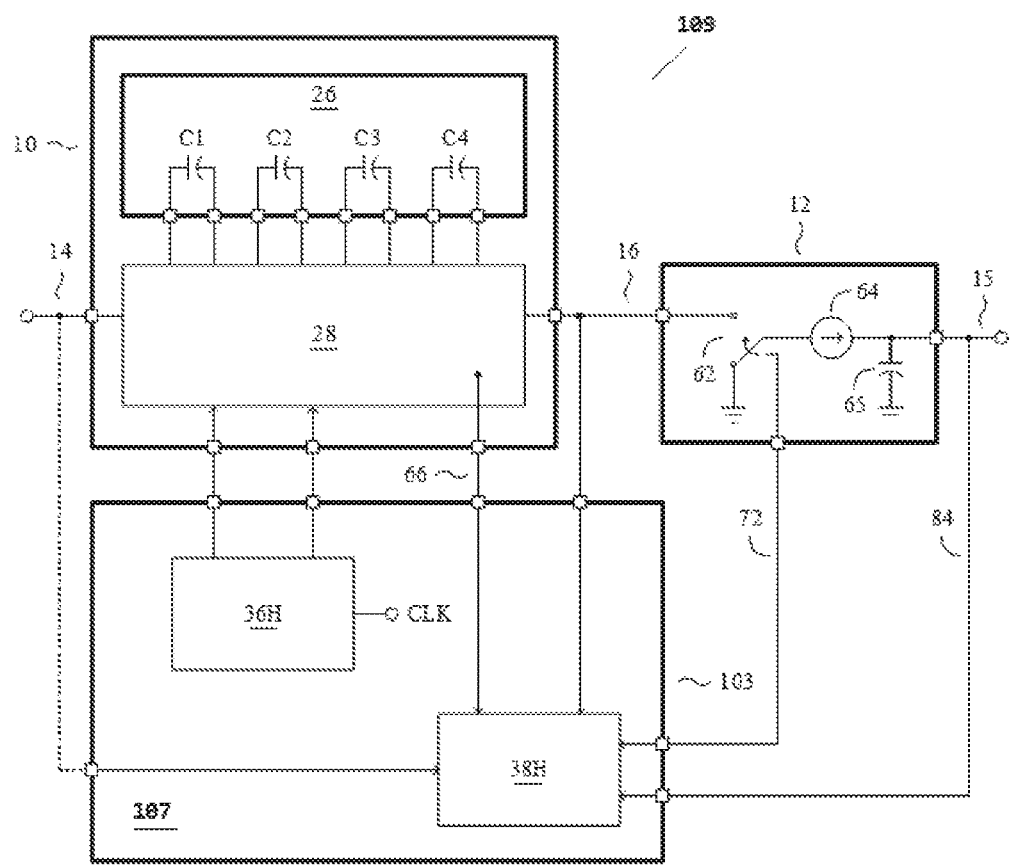
FIG. 15 shows an eighth controller that controls interstate differential to ensure charge balancing across different pump states during charge-pump operation.

FIG. 15 shows a power converter 109 similar to that shown in FIG. 14. Like the power converter shown in FIG. 14, the power converter 109 shown in FIG. 15 transforms a first voltage present at a first terminal 14 into a second voltage present at a third terminal 15. The power converter includes a charge pump 10 connected to a circuit 12. The circuit 12 connects to an intermediate terminal 16 at which the charge pump 10 maintains an intermediate voltage.

As shown in FIG. 15, the circuit 12 includes a current source 64. A suitable implementation of a current source 64 would be an inductance. The circuit 12 also includes an output capacitor 65 across which the second voltage, which is that present at the third terminal 15, can be maintained.

The circuit 12 further includes a switch 62 that switches between first and second states. In the first state, the switch 62 connects the current source 64 to the charge pump 10. In the second state, the switch grounds the current source 64. By controlling the switch 62, it is possible to define a time-varying function that transitions between the values of zero and unity when the switch is in the second and first states respectively. This time-varying function serves as a weighting function for controlling the interstate differential. Because it is implemented by the switch, this weighting function is referred to herein as the "switch function."

In FIG. 15, an eighth controller 107 having an eighth timing-circuit 36H and an eighth feedback-circuit 38H implements a switch function by using the switch 62 to selectively interrupt the electrical connection between the current source 64 and the charge pump 10. Such a switch 62 connects the current source 64 to the charge pump 10 for selected intervals during a particular pump state 18, 20. These intervals are potentially shorter than the durations of the respective pump state 18, 20.

In the foregoing case, the product of this switch function and the load current defines an integrand that, when integrated over the relevant pump state 18, 20, governs how much charge is in either the first charge bolus or second charge bolus.

To achieve a constant interstate differential, non-zero or otherwise, the eighth controller 107 operates the switch 62 in such a way that the amount of charge in the first bolus differs from the amount in the second bolus by the desired interstate differential.

Closing the switch 62 during the charge pump's first pump-state 18 permits charge to flow between the charge pump 10 and the circuit 12 during the first pump-state 18. On the other hand, opening the switch 62 during the first pump state 18 suppresses charge flow between the circuit 12 and the charge pump 10 during the first pump-state 18. It is therefore possible to use the switch 62 to meter the amount of charge transferred between the charge pump 10 and the circuit 12 during the first pump state 18 by controlling how long the switch 62 remains open during the first pump state 18. A similar approach is used to meter the amount of charge that is taken from or supplied to the charge pump 10 during the second pump state 20. This results in a different way to control the interstate differential.

In the ideal case, the interstate differential will be zero. This can be achieved by leaving the switch 62 closed during the first pump state 18 for a first interval and leaving the switch 62 closed during the second pump state 18 for a second interval, with the first interval and the second interval being selected such that the integral of the weighted load-current during the first interval is equal to the integral of the weighted load-current during the second interval. In the limiting case of a constant average load current during the relevant interval, this can be achieved by making the first and second intervals equal.

On the other hand, there may be instances in which a non-zero interstate differential will be required to suppress charge accretion or depletion during multiple cycles. This too can be achieved by leaving the switch 62 closed during the first pump state 18 for a first interval and leaving the switch 62 closed during the second pump state 18 for a second interval. In this case, the eighth controller 107 controls the lengths of the first interval and the second interval such that the integral of the weighted load-current during the first interval differs from integral of the weighted load-current during the second interval by the desired non-zero differential. Assuming constant average load-current, this can be achieved by making the ratio between the first and second intervals match the ratio between the total amounts of charge transferred during the first and second pump states 18, 20.

The foregoing analysis presupposes that the eighth controller 107 only closes the switch once during the first pump state 18 and only once during the second pump state 20. However, this is not necessary. There may be cases in which the eighth controller 107 opens and closes the switch several times in the course of a single pump state 18, 20. There may also be several distinct pump states. After all, the important quantity is the integral evaluated during the particular pump state 18, 20 and not the details of how the integral is arrived at.

To provide effective control, the eighth controller 107 must be able to do more than just change an interstate differential. It must have some basis for knowing when the interstate differential needs to be changed, and preferably in what direction, and even more preferably, by how much.

To provide the eighth controller 107 with some basis for controlling the interstate differential, a sensor path 66 connected to the charge pump 10 provides a balancing signal to the eighth feedback-circuit 38H. In some embodiments, the sensor path 66 connects to the charge pump's second terminal 16.

The balancing signal is a periodic waveform having periods, each of which has a maximum and a minimum. When the interstate differential is at its correct value, the distance between the maxima and the minima of a period remains constant. Otherwise, it tends to drift over time. Whether the maxima and minima are drifting together or apart provides the eighth feedback-circuit 38H with a basis for recognizing an imbalance and a basis for knowing what to do about it. In response, the eighth feedback-circuit 38H causes the switch 62 to adjust the amount of charge delivered during each of the first and second pump states 18, 20 to restore the interstate differential to the correct value as needed.

The eighth feedback-circuit 38H maintains the correct interstate differential by modulating the duty cycle of the switch 62. The eighth feedback-circuit 38H does so by varying the lengths of the times available for charging and discharging the charge pump 10. To do so, the eighth feedback-circuit 38H provides a modulated duty-cycle control path 72 that carries a duty-cycle control signal. The duty-cycle control signal provides need-based charge transfer among charge-pump states by adaptively controlling the duty cycle of the switch 62 based on how much charge transfer is required in each of the first and second pump-states 18, 20 to achieve charge balancing.

Figure 16:
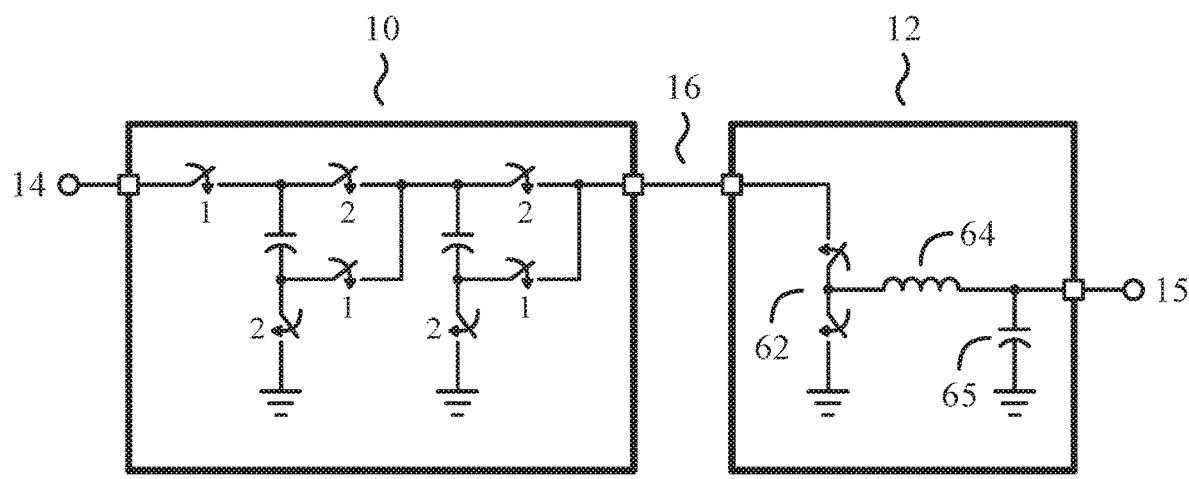
FIG. 16 shows a series-parallel charge pump coupled to a buck converter.
Figure 17:
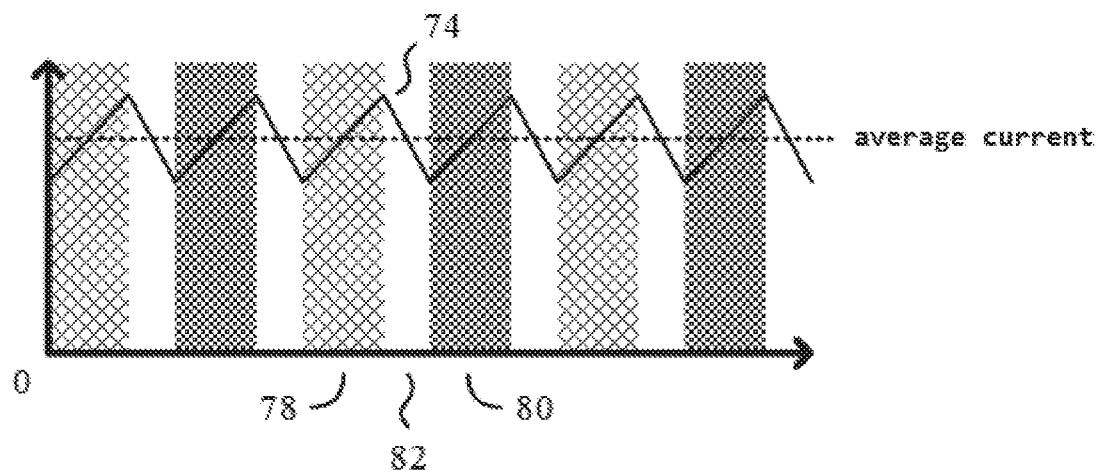
FIG. 17 shows the inductor current that arises when the control system of FIG. 15 causes the first and second switch-states to have equal durations.
Figure 18:
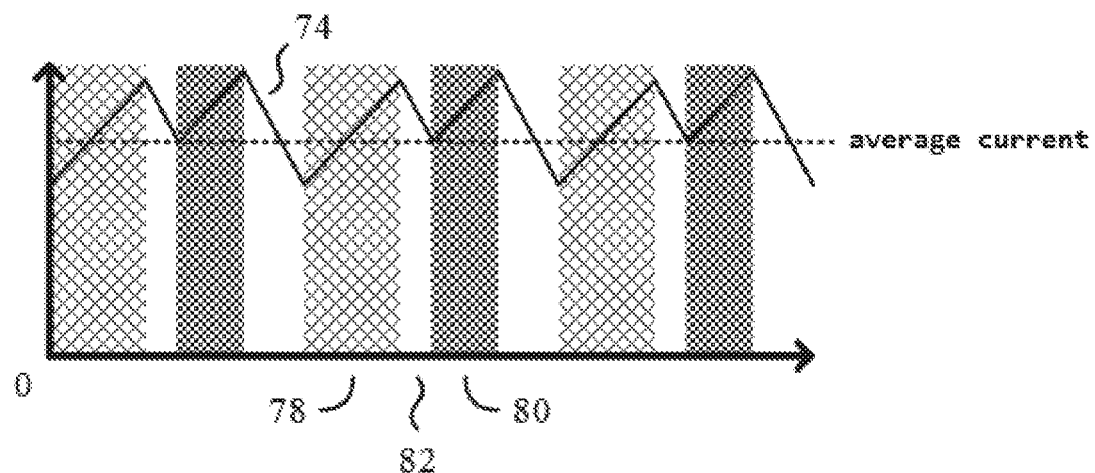
FIG. 18 shows the inductor current that arises when the control system of FIG. 15 causes the first and second switch-states to have unequal durations.

The effect of the eighth feedback-circuit 38H can be understood by careful study of FIGS. 17 and 18 during operation of a series-parallel charge pump 10 shown in FIG. 16. Although a series-parallel pump is shown in FIG. 16, the principle described in connection with FIGS. 17 and 18 applies to other charge pump topologies including, for example, Dickson pumps.

The series-parallel charge pump 10 shown in FIG. 16 transitions between a first pump state 18 in which the capacitors are in series and a second pump state 20 in which the capacitors are in parallel. An inductor implements the current source 14 and a pair of complementary transistors implements the switch 62.

In both FIGS. 17 and 18, the jagged line and the smooth line both represent the current through the current source 64 (i.e., inductor in the figures) as a function of time. The jagged line shows the current source's "instantaneous current 74." The smooth line shows the current source's average current 76, which is obtained by integrating the current source's instantaneous current 74 over an interval and then dividing by the duration of that interval. As shown in the figure, the current source's average current 76 is intended to be constant.

The vertical bars define first, second, and third intervals 78, 80, 82 along the time axis. These intervals correspond to particular states of the switch 62. The third interval 82 comes between a first interval 78 and a second interval 80. In some cases, a first interval 78 precedes a third interval 82 and a second interval 80 follows the third interval 82. However, in other cases, a second interval 80 precedes a third interval 82 and a first interval 78 follows the third interval 82.

In each of the first intervals 78, the switch 62 is in its first switch-state and the charge pump 10 is in its first pump-state 18. In each of the second intervals 80, the switch 62 is in its first switch-state and the charge pump 10 is in its second pump-state 20. In each of the third intervals 82, the switch 62 is in its second switch-state and the charge pump 10 is in whatever pump state it was in during the interval that preceded the third interval 82.

During the course of its operation, the amount of charge transferred when the charge pump 10 is in its first pump-state 18 is the integral of the current source's instantaneous current 74 during all the first intervals 78. The amount of charge transferred when the charge pump 10 is in its second pump-state 20 is the integral of the current source's instantaneous current 74 during all the second intervals 80.

As shown in FIGS. 17 and 18, it is possible to vary the instantaneous current 74 at each point while still maintaining a constant average current 76. However, a byproduct of doing so is an increased spread between the maximum and minimum values of the current source's instantaneous current 74. This increased spread manifests itself as an increased ripple in a voltage maintained by a power converter that includes the charge pump 10 and the circuit 12 as constituents thereof.

In FIG. 17 the first intervals 78 and second intervals 80 all have the same length. Assuming that the averages of the current source's current are equal during the first and second intervals 78, 80, this means that interstate differential is zero.

In this case, the spread between the maximum and minimum values of the current source's instantaneous current 74 is at its lowest, thus minimizing ripple in a voltage being maintained by the power converter.

In FIG. 18, the eighth feedback-circuit 38H has determined that not enough charge had previously been transferred while the charge pump 10 was in its first pump-state 18 to achieve charge balancing. As a result, the eighth feedback-circuit 38H has modulated the duty cycle of the switch 62 so as to lengthen the first intervals 78 and to shorten the second intervals 82. This expands the time available for charge transfer during the first intervals 78 at the expense the second intervals 82. On the other hand, this also increases the spread between maximum and minimum values of the instantaneous current-source current 74, thus introducing greater ripple in a voltage being maintained by the power converter.

The eighth feedback-circuit 38H thus causes more charge to be transferred during the first pump-state 18 than during the second pump-state 20. It does so by arranging the duty cycle of the switch 62 such that the switch 62 spends more of its time in the first switch-state.

In one limiting case, it is possible to completely suppress charge transfer for the entire duration of a charge-pump state by simply keeping the switch 62 in the second switch-state for the duration of the entire charge-pump state. In another limiting case, it is possible to maximize charge transfer by leaving the switch 62 in its first switch-state for the entire duration of the charge-pump state. In between these two extremes, the eighth feedback-circuit 38H precisely meters the amount of charge transfer during a particular charge-pump state by modulating the duty cycle of the switch 62. The granularity with which the amount of charge transfer can be controlled is approximately the product of the current source's instantaneous current 74 at the time that charge transfer is carried out and the shortest possible interval during which the switch 62 can be in its first switch-state.

In placing the correct duty-cycle control signal on the duty-cycle control path 72, the eighth feedback-circuit 38H attempts to maintain a constant interstate differential within the charge pump 10.

The eighth feedback-circuit 38H has only one tool available to it: the duty cycle. Using just this one tool, the eighth feedback-circuit 38H must both control the average voltage maintained by the power converter and, while it is doing so, the interstate differential.

The eighth feedback-circuit's ability to juggle these two tasks arises from what could be regarded as a disadvantage: the delay associated with attempting to control the output voltage. Although the duty cycle of the switch 62 affects the voltage being maintained by the power converter, the effect is slow to occur.

When the eighth feedback-circuit 38H changes the duty cycle during a first pump state 18, the average inductor current will change during the first interval 78. In principle, this should disturb the second voltage, which is that present at the third terminal 15. However, the effect is quite small. In general, a great many charge-pump cycles must elapse before a change in the switch's duty cycle during the first pump state 18 results in a noticeable effect at the third terminal 15.

In contrast, a change in duty cycle has an almost immediate effect on the interstate differential. Therefore, it is in principle possible to at least sporadically control interstate differential without significantly disturbing the voltage maintained by the power converter. However, if this is done cycle after cycle for long enough, the voltage maintained by the power converter is likely to be noticeably disturbed.

However, if after having altered the duty cycle for the first pump state 18, the eighth feedback-circuit 38H judiciously changes the duty cycle during the second pump state 20, then the inductor current, when averaged over the first, second, and third time intervals 78, 80, 82 in FIGS. 17 and 18, does not change. This makes it possible to alter the duty cycle of the switch 62 in a way that promotes a constant interstate differential without causing any perceptible effect on the voltage at second terminal 15.

As shown in FIG. 15, a feedback path 84 extends between the third terminal 15 and the eighth feedback-circuit 38H. This feedback path 84 provides a feedback signal indicative of the voltage at the second terminal 15. The feedback-circuit 38H relies on this feedback signal, the balance signal from the sensor path 66, and a switch signal indicative of the state of the switch 62.

Figure 19:
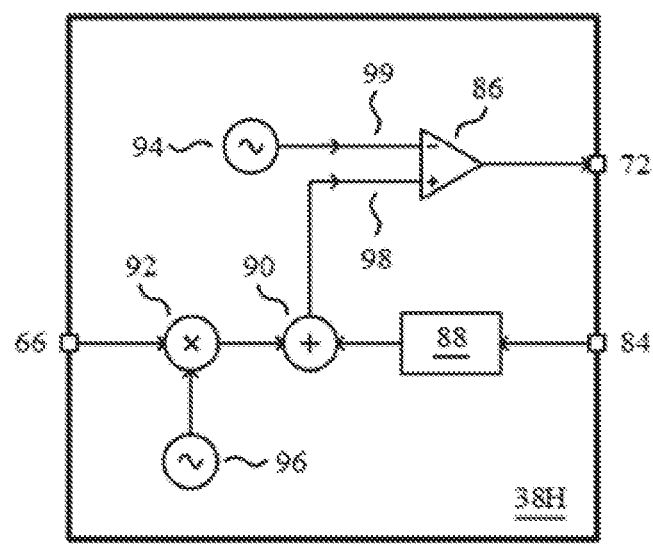
FIG. 19 shows details of one embodiment of the eighth feedback-circuit shown in FIG. 15.

FIG. 19 shows a particular implementation of the eighth feedback-circuit 38H for controlling both interstate differential and the voltage maintained by the power converter at the same time. In the particular implementation show, the eighth feedback-circuit 38H includes a comparator 86, a compensation circuit 88, an adder 90, a modulator 92, a regulator-signal source 94, and a modulating-signal source 96.

In operation, a signal indicative of the voltage at the second terminal 15 passes through the compensation circuit 88 by way of the feedback path 84. The compensation circuit 88 then provides a compensated feedback signal to the adder 90.

Meanwhile, the balancing signal arrives from the charge pump 10 by way of the sensor path 66 and passes into the modulator 92 where it is mixed with a modulating signal provided by the modulating-signal source 96 to form a modulated balancing-signal. The modulating signal has a frequency that is either the same as the charge pump's frequency or that is a harmonic of the charge pump's frequency.

The modulator 92 then provides the modulated balancing-signal to the adder 90, which uses it to offset the compensated feedback signal. This results in an offset signal.

The direction of this offset, namely whether the value of the compensated feedback signal increases or decreases, determines whether the duty cycle will ultimately increase or decrease. The adder 90 thus has the effect of causing a high-frequency tremor to piggyback on the compensated feedback signal. Thus, the compensated feedback signal is able to rise and fall slowly to maintain a constant average voltage at the third terminal 15 while at the same time carrying a high-frequency tremor that can be used to control the interstate differential.

The adder 90 provides the offset signal to a first input 98 of the comparator 86. At the same time, the regulator-signal source 94 provides a regulator signal to a second input 99 of the comparator 86. An output of the comparator places the resulting duty-cycle control signal on the duty-cycle control path 72.

In some embodiments, the regulator-signal source 94 is an internally-generated sawtooth that causes the switch 62 to change state upon crossing a threshold (i.e., first input 98 of the comparator 86). In that case, if the sawtooth is symmetric about the threshold, the duty cycle will be 50%. This is because the amount of time that the sawtooth spends above the threshold equals the amount of time it spends below the threshold.

On the other hand, if one were to cause a vertical offset between the sawtooth and this threshold the sawtooth would increase the amount of time that it spends on one side of the threshold while concomitantly decreasing the amount of time that it spends on the other side of the threshold. This amounts to changing the duty cycle.

The compensated feedback-signal from the compensation circuit 88 is what would slowly raise and lower this threshold. It is by doing so that it controls the duty cycle in a way that causes the power converter to maintain a constant average voltage. What the adder 90 ultimately does is to superimpose a high-frequency tremor on this slowly changing threshold so as to be able to modulate the duty cycle on a cycle-by-cycle basis even as the compensation circuit 88 causes the threshold to change at a more tidal pace.

In other embodiments, the duty-cycle control signal is based in part on a measurement of current between the current source 64 (e.g., inductor current) and the switch 62. However, in either case, the principle is the same. By offsetting the compensated feedback signal by an amount that depends on the need to correct the interstate differential, it is possible to modulate the duty cycle of the switch 62 to maintain a constant interstate differential while also causing the power converter to maintain a constant average voltage.

Since the control over the duty cycle depends on a vertical offset between a periodic waveform (e.g., sawtooth) and a threshold, it does not matter where the offset occurs.

Figure 20:
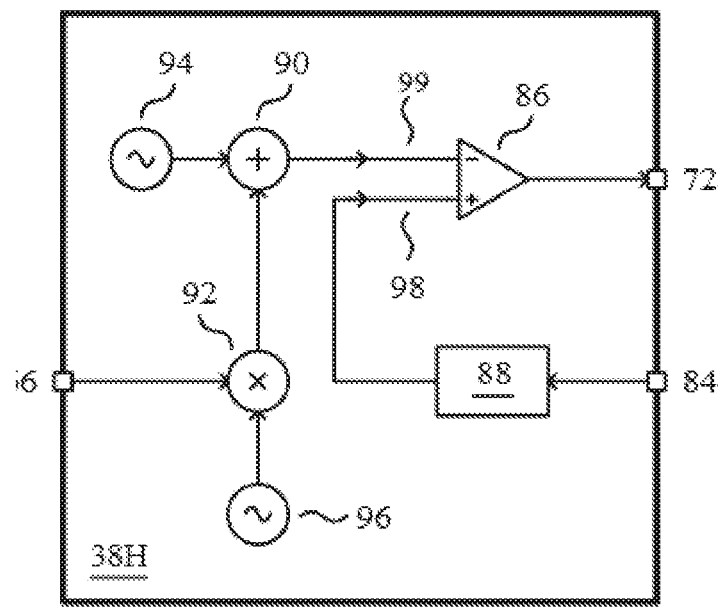
FIG. 20 shows details of another embodiment of the eighth feedback-circuit shown in FIG. 15.

In FIG. 19, the adder 90 offsets the compensated feedback-signal. However, it is also possible to place the adder 90 at the output of the regulator-signal source 94 instead, as shown in FIG. 20. This would cause an offset to the regulator signal instead. Or, it is possible to offset both the regulator signal and the compensated feedback-signal in such a way that the sum of the two offsets results in the desired offset. Ultimately, what matters is that the signals presented to the first and second inputs 98, 99 of the comparator 86 cooperate to cause a vertical offset between the regulator signal and some threshold.

The signal provided to the modulator 92 is ultimately based on the answers to two questions. The first question is the fundamental question of whether a correction is even required. The second question, which comes into play only if the first question is answered in the affirmative, is what sort of correction is required.

Figure 21:
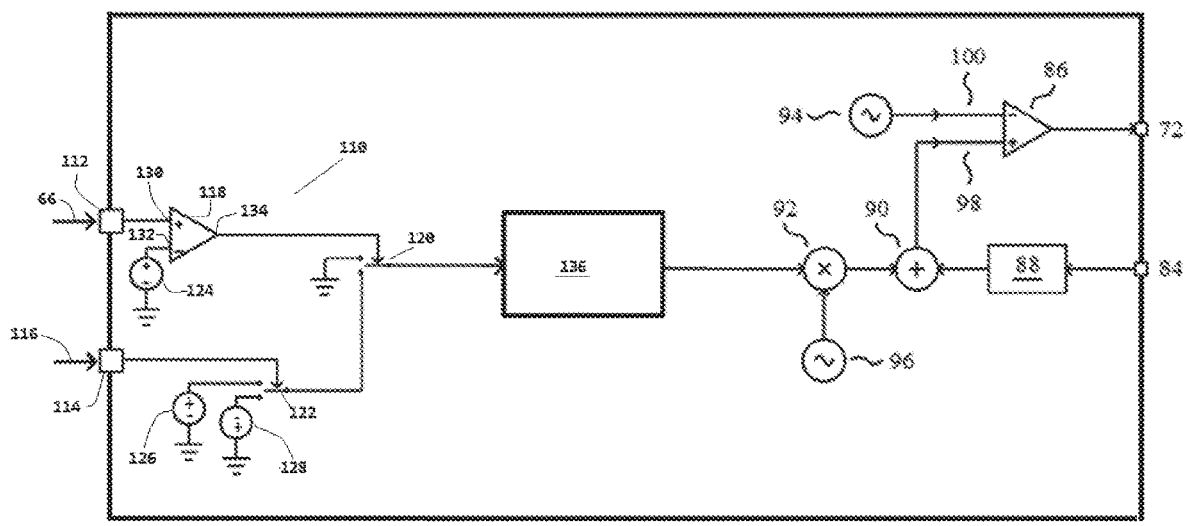
FIG. 21 shows the eighth feedback-circuit shown in FIG. 19 configured to rely on a comparison with a reference voltage rather than with a differential voltage

To answer these questions, it is useful to provide a decoder 110 that modifies the signal received along the sensor path 66 prior to having the modulator 92 mix that signal with the output of the modulating-signal source 96. FIG. 21 shows one such decoder 110 in which the output signal is zero if no correction is needed and the output's sign determines which type of correction is required.

A variety of implementations are possible for the decoder 110, of which only one is shown. However, in all these implementations, the decoder's output is ultimately a signal that is a function of ripple.

The decoder's output signal can be an analog signal, in which case the decoder is carrying out analog modulation. For example, the output of the decoder 110 could be an amplified analog signal having a feature that is indicative of ripple. Or it can be a digital signal that encodes a feature indicative of ripple using some combination of bit values. In some embodiments, the decoder 110 carries out a mix of analog and digital modulation.

In some embodiments, a decoder 110 can include a digital comparator that looks at the value of a ripple function at those points at which the first derivative of the ripple function is zero and uses the difference between such values as a basis for control. In other embodiments, a decoder 110 could also rely on a signal comparator, in which case it identifies points at which the first derivative of a ripple signal on the sensor path 66 is zero, with the sign of the second derivative being dependent on the direction of power flow. In yet other embodiments, the decoder 110 inspects only differential peaks. In other embodiments, the decoder 110 inspects values at peaks of the ripple function and/or values at valleys of the ripple function.

In the particular embodiment shown in FIG. 21, a decoder 110 includes a first input 112 and a second input 114. The first input 112 connects to the sensor path 66. The second input 114 connects to a phase signal 116.

The phase signal 116 is typically a square wave. This phase signal 116 controls which of two options should be exercised to restore the interstate differential to the correct value. In some embodiments, the phase signal 116 is the same as the output of the modulating-signal source 96.

Within the decoder 110 is a comparator 118, a first switch 120, a second switch 122, a first voltage-source 124, a second voltage-source 126, and a third voltage-source 128.

The first voltage-source 124 maintains a reference voltage. The second voltage-source 126 and the third voltage-source 128 have equal voltages but with opposite signs. These two voltages represent the two options available to restore the interstate differential to its correct value, namely either reducing the current drawn or increasing the current drawn.

The comparator has a first input 130, a second input 132, and an output 134. The first input 130 receives the voltage on the sensor path 66. The second input 132 is maintained at a reference voltage by the first voltage-source 124. The output 134 carries a signal that is indicative of whether any correction is needed. This signal controls the first switch 120. If no correction is needed, the first switch 120 connects to ground. Otherwise the first switch 120 connects to either the second or third voltage source 126, 128.

In operation, the comparator 118 compares the reference voltage with the voltage received on the sensor path 66 and uses the result of the comparison to connect the first switch 120 to either ground or two one of the second and third voltage-sources 126, 128. This, in turn, controls the balancing signal provided to the modulator 92.

In a typical embodiment, when the voltage at the first terminal 130 of the comparator 118 remains above the reference voltage, the first switch 120 remains connected to ground. However, once the voltage at the second terminal 16 falls below the reference voltage, the first switch 120 connects to one of the second and third voltage sources 126, 128.

Although it is possible to implement a digital loop with no compensation, it is often useful to have a compensation or filtering stage 136 prior to having the decoder's output reach the modulator 92.

FIGS. 10-15 and FIGS. 6 and 7 features a charge pump 10 that is implemented as a series-parallel switched-capacitor circuit and a circuit 12 that is implemented as a buck converter. However, the principles described herein are also applicable when other kinds of switched-capacitor circuits and regulators.

For example, instead of a series-parallel implementation as shown in the figures, it is possible to implement the charge pump 10 using many different charge pump topologies such as a Ladder, a Dickson, a cascade multiplier, including a two-phase or multi-phase cascade multiplier, a Fibonacci, and a Doubler.

Similarly, it is possible to implement the circuit 12 as a regulator 56 other than a Buck converter. Among these are Boost converters, Buck-Boost converters, non-inverting Buck-Boost converters, Cuk converters, SEPIC converters, resonant converters, multi-level converters, Flyback converters, Forward converters, and Full Bridge converters.

In the figures, the circuit 12 follows the charge pump 10. However, the principles described herein do not require that this be the case. It is possible, for example, for the circuit 12 to precede the charge pump 10. For example, in one embodiment, the charge pump 10 is a two-phase cascade-multiplier and the circuit 12 is a boost converter that precedes the cascade multiplier.

Having described the invention, and a preferred embodiment thereof, what is claimed as new, and secured by Letters Patent is:

1. An integrated circuit for controlling a power converter, the power converter including a charge pump circuit to convert power between a first terminal and a second terminal, and a power converting circuit to convert power between the second terminal and a third terminal, the charge pump circuit having a plurality of pump capacitors forming a capacitor array and a plurality of switches operable to facilitate a transition between different pump states, the power converting circuit including an inductor, the integrated circuit comprising:
   a controller to achieve charge balancing across the different pump states within the charge pump circuit by outputting a duty-cycle control signal to modulate a duty cycle of a power switch within the power converting circuit based, at least in part, on a sensing signal from a sensing path connecting to the charge pump circuit and a modulating signal provided by a modulating-signal source within the controller, to control the power switch to selectively interrupt an electrical connection between the inductor and the charge pump circuit in response to the duty-cycle control signal.

2. The integrated circuit of claim 1, wherein the controller is to control an interstate differential within the charge pump circuit by the duty-cycle control signal, in response to the sensing signal received from the sensing path.

3. The integrated circuit of claim 1, wherein the controller is further to control at least a deadtime interval of the transition between the different pump states based, at least in part, on one or more clock signals.

4. The integrated circuit of claim 1, wherein the controller comprises:
   a modulator to receive a balancing signal relating to the sensing signal received from the sensing path, and mix the balancing signal with the modulating signal to generate a modulated balancing signal;
   a compensation circuit to output a compensated feedback signal according to an output voltage at the third terminal;
   a comparator to output the duty-cycle control signal according to a regulator signal and the compensated feedback signal, wherein at least one of the regulator signal and the compensated feedback signal is offset by the modulated balancing signal.

5. The integrated circuit of claim 4, wherein the controller further comprising:
   a regulator-signal source to provide the regulator signal;
   an adder coupled to the regulator-signal source to offset the regulator signal based on the modulated balancing signal from the modulator to output a modified regulator signal;
   wherein the comparator is coupled to the adder and the compensation circuit to output the duty-cycle control signal by comparing the modified regulator signal and the compensated feedback signal.

6. The integrated circuit of claim 4, wherein the controller further comprising:
   a regulator-signal source to provide the regulator signal;
   an adder to offset the compensated feedback signal based on the modulated balancing signal from the modulator to output a modified feedback signal;
   wherein the comparator is coupled to the adder and the regulator-signal source to output the duty-cycle control signal by comparing the regulator signal and the modified feedback signal.

7. The integrated circuit of claim 4, wherein the controller further comprising:
   a decoder having a first input receiving the sensing signal, and a second input receiving a phase signal, the decoder is to provide the balancing signal according to the sensing signal and the phase signal.

8. The integrated circuit of claim 7, wherein the controller further comprising:
   a compensation or filtering stage between the decoder and the modulator.

9. A power converting system, comprising:
   a charge pump circuit switching between a first pump state and a second pump state to convert a first voltage to a second voltage,
   a power converting circuit coupled to an output of the charge pump circuit to covert the second voltage to a third voltage, the power converting circuit including an inductor, and one or more switching elements coupled between the inductor and the charge pump circuit and switched according to a duty cycle; and
   a controller to control the duty cycle based, at least in part, on a sensing signal from the charge pump circuit and a modulating signal provided by a modulating-signal source within the controller, to achieve charge balancing across the first pump state and the second pump state.

10. The power converting system of claim 9, wherein the controller is to control an interstate differential within the charge pump circuit by controlling the duty cycle to achieve charge balancing.

11. The power converting system of claim 9, wherein the controller is further to control switches within the charge pump circuit and provide at least a deadtime interval between the first pump state and the second pump state based, at least in part, on one or more clock signals.

12. The power converting system of claim 9, wherein the controller is to:
   receive a balancing signal relating to the sensing signal, and mix the balancing signal with a modulating signal to generate a modulated balancing signal;
   detect the third voltage and generate a feedback signal according to the third voltage; and
   output a duty-cycle control signal to control the duty cycle according to the feedback signal, a regulator signal, and the modulated balancing signal.

13. The power converting system of claim 12, wherein the controller is further to:
   modify at least one of the feedback signal or a regulator signal by offsetting the feedback signal or the regulator signal using the modulated balancing signal; and compare the modified feedback signal with the regulator signal, or compare the feedback signal with the modified regulator signal, to generate the duty-cycle control signal.

14. The power converting system of claim 12, wherein a frequency of the modulating signal is the same as or a harmonic of a frequency of the charge pump circuit.

15. The power converting system of claim 12, wherein the power converting circuit comprises: a Buck converter, a Boost converter, a Buck-Boost converter, a non-inverting Buck-Boost converter, a Cuk converter, a SEPIC converter, a resonant converter, a multi-level converter, a Flyback converter, a Forward converter, or a Full Bridge converter.

16. The power converting system of claim 12, wherein the controller is further to:
    compare the sensing signal with a reference voltage;
    provide a ground voltage as the balancing signal when the sensing signal is above the reference voltage; and
    provide, in response to a phase signal, a first balancing voltage or a second balancing voltage as the balancing signal when the sensing signal is lower the reference voltage, the first balancing voltage and the second balancing voltage being equal and opposite voltages.

17. The power converting system of claim 16, wherein the phase signal is substantially the same as the modulating signal.

18. A method for controlling a power converter, comprising:
    receiving a sensing signal from a charge pump circuit;
    receiving a feedback signal from a power converting circuit coupled to the charge pump circuit; and
    controlling, based on the sensing signal and the feedback signal, a duty cycle for one or more switching elements coupling between an inductor within the power converting circuit and the charge pump circuit to achieve charge balancing across different pump states within the charge pump circuit.

19. The method of claim 18, further comprising:
    generating a balancing signal relating to the sensing signal;
    mixing the balancing signal with a modulating signal to generate a modulated balancing signal;
    modifying at least one of the feedback signal or a regulator signal by offsetting the feedback signal or the regulator signal using the modulated balancing signal; and
    comparing the modified feedback signal with the regulator signal, or comparing the feedback signal with the modified regulator signal, to generate a duty-cycle control signal to control the duty cycle.

20. The method of claim 19, wherein generating the balancing signal comprises:
    comparing the sensing signal with a reference voltage;
    when the sensing signal is above the reference voltage, providing a ground voltage as the balancing signal; and
    when the sensing signal is lower the reference voltage, providing, in response to a phase signal, a first balancing voltage or a second balancing voltage as the balancing signal, the first balancing voltage and the second balancing voltage being equal and opposite voltages.

21. The method of claim 18, wherein the duty cycle is controlled by a duty-cycle control signal generated using a modulating signal provided by a modulating-signal source.

* * * * *